(12) United States Patent
Shriver

(10) Patent No.: US 11,354,490 B1
(45) Date of Patent: Jun. 7, 2022

(54) SYSTEMS, METHODS, AND COMPUTER READABLE MEDIA FOR CREATING SLIDE PRESENTATIONS

(71) Applicant: Matthew Connell Shriver, Chappaqua, NY (US)

(72) Inventor: Matthew Connell Shriver, Chappaqua, NY (US)

(73) Assignee: Intellectual Property Demonstratives, Inc.

( * ) Notice: Subject to any disclaimer, the term of this patent is extended or adjusted under 35 U.S.C. 154(b) by 0 days.

(21) Appl. No.: 16/914,184

(22) Filed: Jun. 26, 2020

Related U.S. Application Data

(63) Continuation of application No. 16/590,330, filed on Oct. 1, 2019, which is a continuation of application No. 15/456,384, filed on Mar. 10, 2017, now Pat. No. 10,460,023.

(60) Provisional application No. 62/306,599, filed on Mar. 10, 2016.

(51) Int. Cl.
| | |
|---|---|
| *G06F 40/186* | (2020.01) |
| *G06F 40/117* | (2020.01) |
| *G06F 40/14* | (2020.01) |
| *G06F 40/169* | (2020.01) |
| *G06F 3/0482* | (2013.01) |
| *G06F 40/106* | (2020.01) |
| *G06F 3/0486* | (2013.01) |

(52) U.S. Cl.
CPC ......... *G06F 40/169* (2020.01); *G06F 3/0482* (2013.01); *G06F 3/0486* (2013.01); *G06F 40/106* (2020.01); *G06F 40/117* (2020.01); *G06F 40/14* (2020.01); *G06F 40/186* (2020.01)

(58) Field of Classification Search
CPC .. G06F 16/4393; G06F 3/0482; G06F 40/169; G06F 40/117; G06F 40/106; G06F 40/14; G06F 3/0486; G06F 40/186
See application file for complete search history.

(56) References Cited

U.S. PATENT DOCUMENTS

| | | | |
|---|---|---|---|
| 6,297,824 B1 * | 10/2001 | Hearst | G06F 16/954 |
| | | | 715/848 |
| 6,865,714 B1 * | 3/2005 | Liu | G06F 16/9577 |
| | | | 707/E17.121 |
| 7,360,159 B2 | 4/2008 | Chailleux | |
| 7,698,627 B2 | 4/2010 | Asakawa et al. | |
| 7,779,355 B1 | 8/2010 | Erol et al. | |

(Continued)

FOREIGN PATENT DOCUMENTS

| | | | |
|---|---|---|---|
| EP | 1596269 A3 | 11/2005 | |

OTHER PUBLICATIONS

Tomohide Shibata et al., "Automatic Slide Generation Based on Discourse Structure Analysis", R. Dale et al. (Eds.) IJCNLP 2005, LNAI 3651, pp. 754-766, 13 pages, 2005.

*Primary Examiner* — Scott T Baderman
*Assistant Examiner* — Mario M Velez-Lopez
(74) *Attorney, Agent, or Firm* — Fox Rothschild LLP

(57) ABSTRACT

Systems, methods, and computer readable medium are provided that relates to the field electronic slide presentation applications. Improvements to add new features and functionality in that field are illustratively described. In some embodiments, an automated feature is provided that generates high-quality presentation slides from source content. Other features are contemplated including features related to security, GUIs, smart templates, and others.

29 Claims, 22 Drawing Sheets

(56) References Cited

U.S. PATENT DOCUMENTS

| | | | |
|---|---|---|---|
| 8,285,085 B2* | 10/2012 | Manico | H04N 1/00175 |
| | | | 715/730 |
| 8,296,654 B2 | 10/2012 | Ahlberg et al. | |
| 8,533,586 B1 | 9/2013 | Meyer et al. | |
| 8,739,032 B2* | 5/2014 | Walsh | G06F 16/93 |
| | | | 707/723 |
| 9,298,818 B1 | 3/2016 | Donneau-Golencer et al. | |
| 10,146,800 B2* | 12/2018 | Nauerz | G06F 16/4393 |
| 10,380,231 B2 | 8/2019 | Barber et al. | |
| 2002/0154120 A1 | 10/2002 | Cullimore et al. | |
| 2003/0084404 A1 | 5/2003 | Dweck et al. | |
| 2004/0024739 A1* | 2/2004 | Copperman | G06F 16/367 |
| | | | 707/E17.084 |
| 2005/0125395 A1* | 6/2005 | Boettiger | G06F 16/951 |
| 2006/0053364 A1 | 3/2006 | Hollander et al. | |
| 2007/0186167 A1* | 8/2007 | Anderson | G06F 40/186 |
| | | | 707/999.1 |
| 2008/0082929 A1* | 4/2008 | Stignani | G06Q 10/06 |
| | | | 715/764 |
| 2009/0037821 A1 | 2/2009 | O'Neal et al. | |
| 2009/0210796 A1* | 8/2009 | Bhogal | G06F 16/4393 |
| | | | 715/730 |
| 2009/0276455 A1* | 11/2009 | Yu | G06F 16/93 |
| 2011/0035692 A1 | 2/2011 | Sandone et al. | |
| 2011/0296321 A1 | 12/2011 | Lord | |
| 2012/0236201 A1 | 9/2012 | Larsen et al. | |
| 2012/0304247 A1* | 11/2012 | Badger | G06F 16/951 |
| | | | 726/1 |
| 2012/0323880 A9 | 12/2012 | Al-Kofahi et al. | |
| 2013/0155088 A1 | 6/2013 | Wang et al. | |
| 2014/0006424 A1 | 1/2014 | Al-Kofahi et al. | |
| 2014/0115440 A1 | 4/2014 | Datar et al. | |
| 2014/0115442 A1 | 4/2014 | Caten | |
| 2014/0215299 A1 | 7/2014 | Bellamy et al. | |
| 2016/0087929 A1* | 3/2016 | Vembu | G06F 40/117 |
| | | | 709/206 |
| 2016/0110031 A1 | 4/2016 | Johnson | |
| 2016/0147848 A1* | 5/2016 | Krishnan | G06F 16/34 |
| | | | 707/722 |
| 2016/0283491 A1* | 9/2016 | Lu | G06F 16/3322 |
| 2016/0378718 A1 | 12/2016 | Jarroush | |
| 2017/0046350 A1 | 2/2017 | Lunsford et al. | |
| 2019/0258706 A1* | 8/2019 | Li | G06F 16/4393 |
| 2020/0142856 A1* | 5/2020 | Neelamana | G06F 16/31 |
| 2020/0142997 A1* | 5/2020 | Kondadadi | G06F 16/35 |
| 2020/0320254 A1* | 10/2020 | Hebenthal | G06N 5/04 |

* cited by examiner

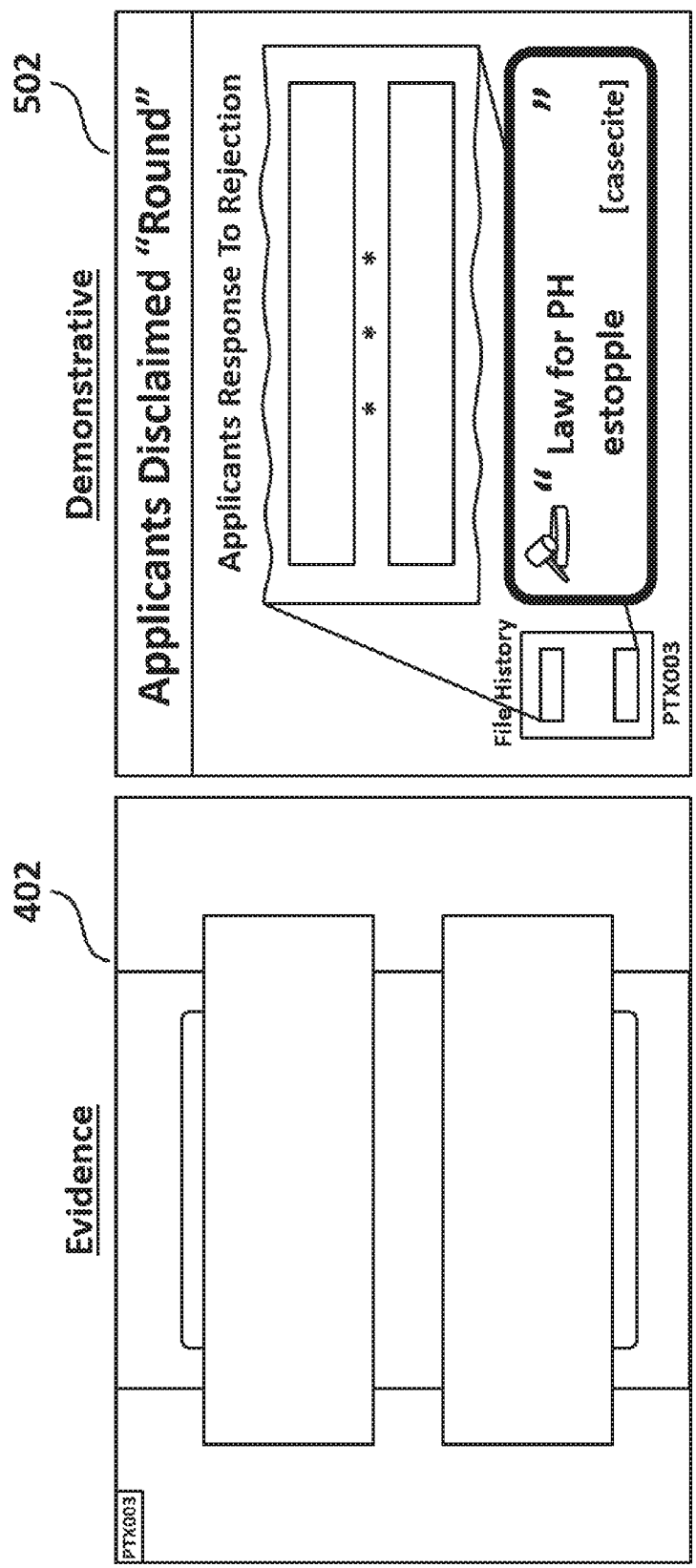

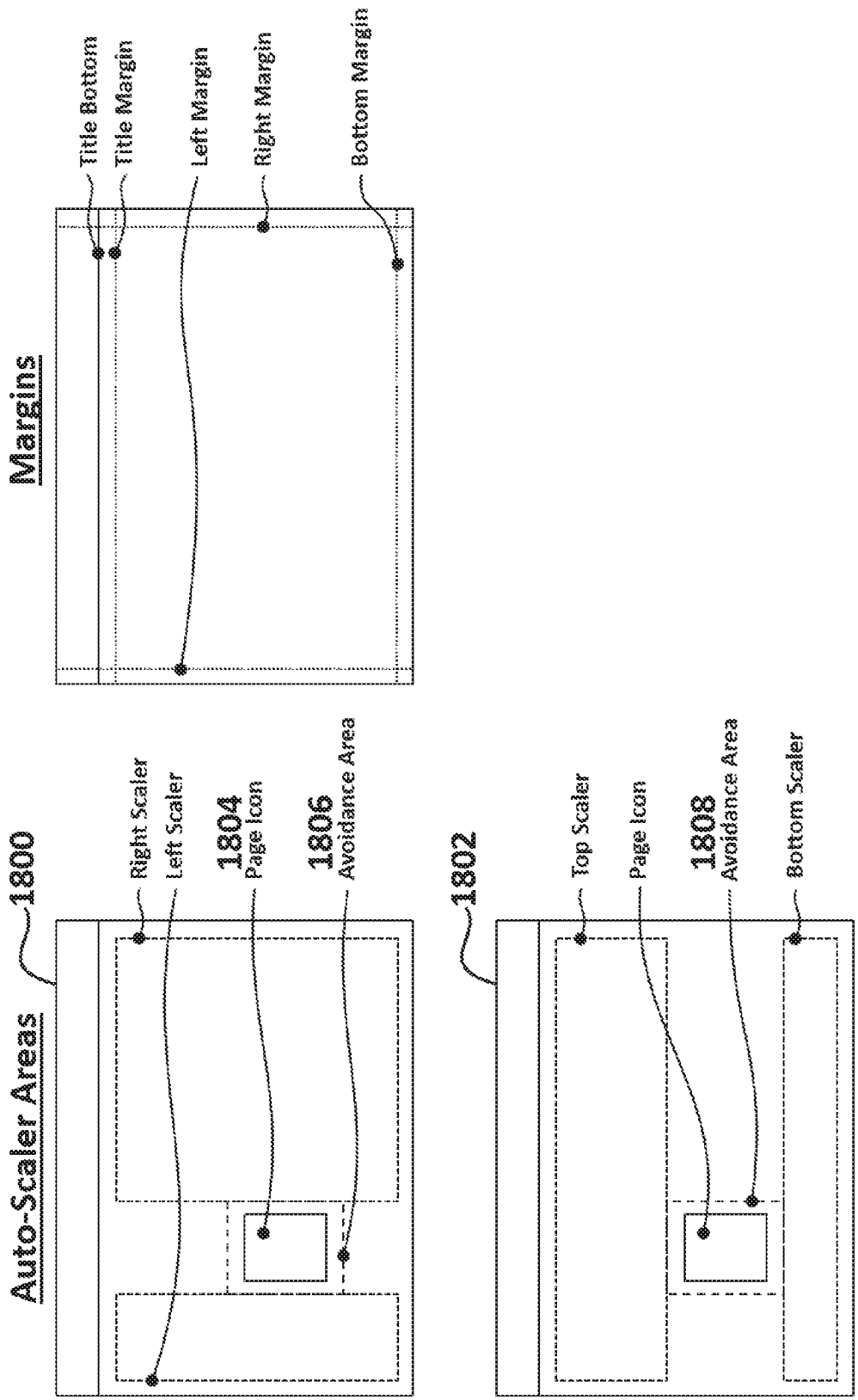

SYSTEMS, METHODS, AND COMPUTER READABLE MEDIA FOR CREATING SLIDE PRESENTATIONS

CROSS-REFERENCE TO RELATED APPLICATIONS

This application is a continuation of U.S. patent application Ser. No. 16/590,330, filed Oct. 1, 2019, which is a continuation of U.S. patent application Ser. No. 15/456,384, filed Mar. 10, 2017, now U.S. Pat. No. 10,460,023, which claims priority to provisional U.S. Patent Application No. 62/306,599, filed Mar. 10, 2016, the disclosures of each of which are hereby incorporated by reference in its entirety.

BACKGROUND

As a preliminary matter, the present application is directed to a field of computer technology related to slide presentations and software applications for creating and presenting slide presentations. Slide presentation applications, such as Microsoft PowerPoint, are well known to the public and have been in use for many years. PowerPoint, for example, launched over 25 years ago. A typical slide presentation application comprises one or more computer programs that execute on a computer such as a personal computer, tablet, or smartphone. In addition to having the ability to present presentation slides, slide presentation applications typically include features for creating and editing presentation slides or a sequence of slides, sometimes referred to as a slide deck.

In operation, a slide presentation application typically provides a graphical user interface ("GUI") that displays an art board including a work area for use by the user. The art board is a space that is displayed by the GUI, while the work area is a page that is displayed in that space. The GUI displays the art board as a background for the work area. The work area represents the geometric shape and size of the slide. In particular, the work area is a page, initially an empty page, that provides a spatial area with boundaries. The page is a user-selectable size, such as Letter, Legal, A4, etc. The slide presentation application can also allow the user to select a custom size for the page. The GUI includes features that allow a user to create a new slide by allowing the user to add slide elements to the work area and to edit the slide elements, such as by moving, sizing, or adding content. As part of this process, the GUI can provide the user with the option to start the new slide with a blank page or a combination of a blank page and a user-selected template for the slide.

The meaning of a slide element would generally be understood to those of ordinary skill in this field of technology. For example, it would generally mean a software item, adapted for a slide presentation application, that can be added to or removed from a (electronic) presentation slide for allowing a user to create and configure a slide, and which software item may have (but is not required to have) displayed spatial properties within the slide when the slide is being edited via a GUI or when it is rendered.

A slide template is a common tool in slide creation applications. It is used to predefine a set of slide elements for application to a slide. The slide elements can include background color or other general graphics for the slide as a whole. The template can also define slide elements such as one or more visual or content boxes for displaying user content and the general arrangement of the boxes on the slide.

Slide elements can include images, graphics, video, text, animation, or other types of elements. The GUI permits the user to position the location of different slide elements and in doing so permits the user to position elements in the work area. This can include positioning slide elements in a way that they extend or exist outside of the work area and over the art board. The GUI also permits the user to change properties of some slide elements, such as the color and font size of text, or the volume and speed of playback of a video element.

The slide presentation application provides the user with the ability to save the combination of the page, referring to the page size of the work area, and configured (e.g., positioned) slide elements added to the work area. In operation, the slide presentation application can provide the ability to create or edit a slide and can play the slide. In other words, there is a set of configuration information and user content that together display or "play" a presentation slide when the presentation slide is selected to be played. This saved combination defines a presentation slide. When the presentation slide is selected to be played, the slide presentation application retrieves the saved configuration and plays the slide in accordance with the configuration of the page and its elements. An underlying point being that a slide exists in a different state when it played as opposed to when it is being created or edited. Also, for clarification, slide elements can also refer to a configuration or properties of the slide as a whole, such as its background color or theme.

Overall, slide presentation applications specify a specific construct, or methodology, that is used for making, modifying, saving, generating, and displaying presentations involving a sequence of slides incorporating a variety of visual elements with specified properties. The construct is different from other common types of applications such as word processing, spreadsheet, or image processing.

Slide presentation applications have widespread adoption and are, in general, a standard part of the suite of software tools used by business and personal users. The application is used in any field in which an individual seeks to present information to an audience. This includes fields such as education, legal, financial, technology, and management.

Despite its widespread use, applications in this field have, in general, have remained generally static with respect to core functionality for creating or editing slides and are often times difficult to use. As such, there has been a longstanding need to improve this field of technology. They can also be tedious to use if a user seeks to prepare a deck of slides with varying content but which also requires consistent design layouts across the slides in the deck. There has also been very little known advancements in the field of slide creation applications as it relates to litigation graphics.

The known processes typically still involve reliance on the subjective decisions by the user of the application. It can also involve imprecision in creating slide arrangements because they rely on the visual or manual positioning of element. There is no known precise way to produce slides that incorporates features that improve the usage of space and presentation quality. Known systems also are incapable of intelligently differentiating between different content and applying different graphics properties or rules to different content in producing slide elements and arrange slide elements in a new slide. Known systems are also incapable of harnessing the graphic capabilities of existing slide creation applications.

One aspect that is unique to this field is that in practical effect a single software application serves this market. Another unique aspect is that individuals typically use content from other applications as part of a slide in their presentation. A user may, for example, add content from a PDF document to be part of a slide. Existing processes for providing this "cross-over" are deficient because, for example, they can result in generating a slide that has poor quality and are time-consuming.

This is not an exhaustive explanation and it would be understood that other deficiencies exist and the technology contemplated herein includes advantages that assist in these areas and potentially other areas.

SUMMARY

In accordance with principles of the present invention, systems, methods, and computer-readable media are provided that are directed to improved features in the field of slide presentation and slide creation applications.

For example, a presentation slide creation system which allows for making, modifying, saving, and displaying presentation slides and which automatically generates presentation slides is provided that comprises a slide creation application implemented on a computer using computer-readable software instructions stored in non-volatile memory. A slide creation application refers to an application that at least includes features for creating and modifying individual slides. According to embodiments of the present invention, a slide creation application is provided that is configured to provide one or more features and functionalities which are illustratively described herein. Preferably, the application is stored in non-volatile memory, such as a hard drive of a computer, external non-volatile memory accessible by the computer, hardware specifically configured to provide the application, combination of different types of non-volatile memory, etc. Volatile memory can be used in performing computer operations as is generally known. Memory is understood to be implemented using tangible electronic equipment such as electronic circuitry and disk drives. In some embodiments, if desired, the application is configured at least partially by implementing integrated circuitry that can perform processing as opposed to a purely software implementation of the application that stores computer readable instructions in memory that is retrieved and processed by a central processing unit.

The term "computer" is used to refer to one or more computers and can, for example, be a personal computer, server, virtual server, cloud computer, tablet, smartphone, etc.

The slide creation application provides a user with the opportunity to select a slide template that defines slide elements and related layout of the defined slide elements, for application to individual new slides. Different types of slide elements are illustratively described herein and will be understood to those of ordinary skill in the art.

In response to a user selecting a slide template, the slide creation application retrieves the selected slide template for use in the current slide. With respect to an automated process for the integration of user content, the slide creation application retrieves a source document comprising content and associated data, which are stored in a first application format. The source document can be identified for the slide creation application in a number of ways, such as by the slide creation application identifying whether the user has a document currently open in another application. The source document can, for example, be a PDF document or other type of source document such as a Word document, web page, image file, or JPG document. The source document is stored in a file format that is different from the file format used by the slide creation application. The source document can be a single file or a collection of files. The source document includes "content," which refers to one or more images (including graphics) or text that is stored in the source document for the purpose of being viewed (understood) by users.

The term "associated data" refers to the data, other than the content, that is embedded into the source document for purposes of providing formatting or other underlying information (e.g., position information for user annotations). It can include annotations that a user added to the content or over the content (when it is added in relation to a particular spatial location on a page of the source document). This, for example, can include comments such as graphical boxes that a user adds to a PDF document using Adobe Acrobat Reader or Adobe Acrobat Pro.

Adobe Acrobat Reader and Adobe Acrobat Pro are often used by the public to view and annotate PDF documents, and currently, users, in general, have a great amount of familiarity with Adobe Acrobat. Embodiments of the present invention permit users to simply annotate a PDF document using Adobe Acrobat Pro or Adobe Acrobat Reader or other programs which can annotate PDF documents, and the slide creation application of the present invention automatically generates a slide using the user annotations in the PDF document. The slide creation application may require the user to select a slide template such as the default slide template that is used in the process.

The slide creation application is preferably configured to automatically locate the user annotations in the document. In particular, the slide creation application processes the associated data in the source document to locate one or more user annotations in the source document and user-selected document content. Also, if a particular page of the document is identified to the slide creation application, the slide creation application can locate user annotations added to that page.

The slide creation application can locate a user-selected document, such as by locating a relationship between a located user annotation and a location associated with that annotation on a page of the source document. Other methods of identifying or locating content in the source document, such as by scanning a page of source document or entering a citation into an interface, are also contemplated. Once located, the slide creation application can retrieve the one or more located user annotations.

PDF is a file format used to present and exchange documents in a manner independent of application software, hardware, and operating systems. Embodiments of the present inventions are particularly suited for situations involving a source document that is in the PDF file format or that type of file format.

The slide creation application preferably includes a conversion process that comprises procedures that convert user annotations (including related data) from the first file format to a second file format. This generally refers to a process for converting user annotations in the first format (e.g., PDF) to an intermediate state such as one or more annotation sets or to a destination state such as one or more slide elements (e.g., PowerPoint). In this two-step process, there can be conversion from a first file format to a second file format and subsequently, to a third file format. The term "converting" is used to indicate that there is a conversion being performed from a raw or coded state to an intended meaning for that raw or coded state in the second (or destination) file format. As described, there may also be intermediate conversion states. In some embodiments, there is also intelligence as part of the conversion process that evaluates information in user annotations and knows that different information is to communicate different slide-related characteristics. The process involves customized conversations that depend on information in user annotations.

For example, a user annotation may be a graphical box added over a portion of an image of interest and the conversion process will convert that information to be an annotation set, which comprises annotation information (e.g., in text format) that describes the user annotation and includes an image (e.g., an image or a link to an image). The annotation information in the annotation set can include different characteristics related to the user annotation such as annotation type, size, dimension, orientation, or location on a page.

The conversion process can include a range of conversions, including a spatial transformation of a position in a page in a first file format to the same position in the page in a second file format. To clarify, the first and second file formats can often use different ways to identify spatial location within a page.

Other conversions, such as customized conversions, can involve identifying a code in the user annotations that informs the conversion process that the related text or image is a certain type of field in a slide. For example, a text code in the user annotation, or one that is in an annotation set can be one that the application is programmed to interpret to add emphasis or apply a corresponding configuration to an associate title, text, or image. As mentioned above, it should be understood that the slide creation application or a related module is configured to contain intelligence for understanding a direct conversion or a customized conversion. Direct conversion refers to converting a graphical representation or item in a first application to the same graphical representation or item in a second application (e.g., a box drawn as an annotation in a PDF document is converted to be a box drawn in a PowerPoint document).

The slide creation application converts, by applying the conversion process, one or user annotations from a first document application format into one or more corresponding annotation sets. The conversion process or some other process within the application can further convert one or more annotation sets to one or more corresponding slide elements in the second application format. As mentioned above, there can be a two-step process that involves first converting a user annotation into an annotation set and next, converting the annotation set to one or more corresponding slide elements in accordance with a second document application format. For example, user annotations in a first file format such as PDF are converted into a second file format such as PowerPoint or other destination format. Preferably, the second file format is a file format for creating, storing, and playing presentation slides.

It is also possible for the user annotations that are located in the source document to contain text for the purpose of being displayed in corresponding slide elements in the slide creation application. The slide creation application appropriately analyzes and includes the text in corresponding slide elements. Such text can be text added as a comment within a "comment bubble" added over a document page in the application associated with the first file format.

The computer-implemented process of the slide creation application includes a graphics process or graphics engine. As a matter of convenience, the two terms are used in the application to connote a similar meaning, but it should be understood that "graphics engine" has a more specific meaning in that it is intended to communicate that it provides graphics capabilities or features that supplement or are in addition to the graphics capabilities or features that are resident in an external slide creation application. The graphics engine would perform its operations based on or using knowledge of functionality within the external slide creation application. At least one type of output of the graphics engine is preferably compatible with the external slide creation application such that the external slide creation application can use the added features or capability to display a slide containing that feature or capability without requiring a modification to the external slide creation application. In simpler terms, the graphics engine will preferably know about functionality available within the external slide creation application and will use the ability to control that functionality in the external slide creation application to provide a new (more advanced) function or tool to the user. The discussion will primarily use the term "graphics process" but it should be understood, at least based on context, that the discussion is also with respect to the graphics engine, and that the converse is also true.

The graphics process comprises procedures that detect spatial conflicts using the user-selected slide template, the one or more slide elements, a page size, and the user-selected document content. To clarify, it should be understood that the use of a slide template is not always required. For example, a starting point can involve user content, programmable slide presentation rules, and slide dimensions. Also, detecting spatial conflicts is not always necessary. In some embodiments, detecting spatial conflicts may exist but in an implicit way in the sense that the system analyzes and determines slide elements to product and the arrangement of slide elements in a way that resultant does not include conflicts. In some embodiments, the graphics process creates slide elements including the selection of the size and/or position of slide elements by analyzing and determining an arrangement based programmable spatial slide presentation rules that implement feature discussed herein. This process can use the dimensions of user content to produce slide elements that reach or do not exceed adjacent elements or slide boundaries. This process can take into account minimal desired distances between elements (which can also be dimensions that are not scaled). Accordingly, the resultant slide is created automatically, with precision and without reliance on subjective analysis. In this embodiment, conflict is not necessarily detected but is avoided by using mathematical calculations and rules to specify dimensions and positions of slide elements that are being produced. The graphics process is capable of analyzing spatial relationships, boundaries, and limits of a slide and its slide elements. The graphics process determines the initial spatial size of slide elements and their position in a slide based on the slide template. A group of slide elements that are contained within a larger element can be evaluated by the graphics process using the spatial size of the larger element.

The slide creation application can include a scaling property indicator associated with a slide element that specifies whether the slide element is one that can be scaled or should be maintained at a static size. The graphics process can also identify the page size for the slide and use predetermined margin limits and a predetermined minimum spacing distance between elements or types of elements. Programmable spatial slide rules can be implemented to configure these features. The graphics process is configured to perform conversions or transformations, including transformation of positional, dimensional, orientation, and shape information from one coordinate system to another.

The graphics process processes this spatial information and detects spatial conflicts. Spatial conflicts can include detecting that slide elements overlap or interfere with each other (e.g., based on their current spatial size, location, and orientation). A larger slide element that contains smaller slide elements can be used by the graphics process for the spatial evaluation without having to evaluate the smaller slide elements within the larger element. Individual slide elements or elements within a larger element can also be evaluated (with respect to positioning, conflicts, or arrangement within the larger element). The graphics process also detects spatial conflicts when one or more slide elements extend into the predetermined margin space of the page or extend outside the page. The graphics process also detects spatial conflicts when slide elements are too close to each other by detecting whether slide elements are less than the predetermined minimum spacing distance between each other. Again, it should be understood that a larger element that contains slide elements can be a basis for determining a conflict arising from minimum spacing or margins between the larger element and an adjacent element.

In response to detecting a conflict, the graphics process moves, sizes (e.g., resizes by scaling), and formats the slide elements, user-selected document content, or both from a first state to a second state, and thereby generates a resultant slide containing the slide elements and user-selected document content, including the slide elements or user content in the second state, in accordance with the slide template. The graphics process would be configured, preferably to move, size, and format, but in other embodiments, the capability is limited to one or some of those functionalities. Other similar functionality is also contemplated. Once a spatial conflict is detected, the graphics process applies one or more spatial reconfigurations that avoid the detected conflict. The spatial reconfiguration can include modifying one or more slide elements (information specifying a slide element) from their current state to a second state by moving, sizing, or formatting slide elements or user content (e.g., an image from another file being formatted by way of scaling or other process formatting). Other formatting operations such as scaling font size or moving text location are also contemplated. Another form of spatial configuration relates to a best fit operation in which different content is mapped to different placeholders (e.g., scaler areas in a template) based on spatial size and/or shape, and potentially, other factors such as type of content (e.g., factual quote versus argument). The graphics engine can also detect multiple (simultaneous) conflicts, which may be different types of conflicts, process the spatial information and identify moves, resizing, or reformatting that avoids all or some of the conflicts without creating new conflicts. The graphics engine performs this by processing the spatial data and determining the results of different combinations of modifications. From this, it identifies a final state to be used. The graphics process can also include requirements for a minimum or maximum size for an element or different spatial settings for different types of slide elements.

The graphics engine can also implement a process that maximizes or optimizes the size of slide elements or particular types of slide elements. It can incorporate this as part of determining the results of different combinations of modifications or arrangements. As such, the graphics engine dynamically detects and avoids conflicts and also identifies a best spatial size or location for a slide element. The analysis includes evaluating the location, size, and spatial interrelationship of two or more elements and applies a preferred size range that maximizes two or more elements without creating conflicts. The graphics engine can also evaluate the shape and size of an element and determine whether the shape or size is within a predetermined range that is preferred or acceptable for that type of element. The operation of the graphics engine with respect to analyzing and determining size and location for the slide elements (which can typically include many elements) involves evaluating a complex set of spatial interrelationships between slide elements. In the past, an individual could manually interact with a slide through a GUI to position elements. However, this manual operation would not be able to account for the many factors (e.g., scaled and non-scaled) involved in generating a presentation slide or in generating a sequence of slides in a presentation with efficiency, accuracy, and consistency. The graphics engine performs these processes to generate a resultant slide that applies the arrangement specified in the user-selected template. The slide creation application or some other application can provide the user with the opportunity to view the resultant slide in an art board and to edit the resultant slide. The graphics engine can be applied to the resultant slide so as to generate a revised slide containing one or more size, position, or format modifications to the slide elements or user content.

It is important to highlight that preferred embodiments of the invention involve implementing optimal or best fit arrangements with respect to the interrelationship of slide elements and other slide properties, as opposed to simply specifying the maximum size for slide elements. It also involves the incorporation of source content (having varying shapes and sizes) into one or more slide elements and the relational impact of the incorporation to other slide elements or slide properties (specified in a template). As part of this, the embodiments will also evaluate the size, shape, and/or orientation of excerpts and compare it with the information for the size, shape, and/or orientation of one or more proposed slide elements in a template and in response, select a best fit for inserting the excerpt(s) in to which one(s) of the proposed slide elements. Best fit can involve identifying a matching orientation, size, shape, or a combination thereof and can also involve evaluating multiple excerpts for insertion into a slide.

The conversion process, mentioned above, can include a procedure that transforms a location of a user annotation in the first file format to a spatial location in a page in the second file format. For example, the conversion process can read a user annotation that identifies a section of a page in a source document, wherein the user annotation is in a first file format (such as PDF) and converts that spatial location on the page to a spatial location in the image in a second file format (such as PowerPoint). To further clarify, different applications and file formats can use different methods for defining a spatial location for points in a page or image. A conversion process is performed to accurately translate the location from the first application, which uses one type of coordinate system, to a location in a page in the second application, which uses a different coordinate system. The issue can be important when the system is creating a slide that displays a location of an annotation within an image or page (e.g., to demonstrate where exactly a quote or excerpt is located in a source document). Without the proper transformation (e.g., between coordinates), the slide would not provide an accurate depiction.

The slide creation application can be configured to automatically establish a corresponding relationship between an annotation set and a slide element (proposed slide element). The slide creation application can read information in an annotation set and, for example, from that information identify the type of slide element that matches that annotation. The slide creation application can also read the current slide template and identify slide elements in the template that match that type. The slide creation application uses that matching information to establish a correspondence between an annotation set and slide elements in the template. The slide creation application can, for example, use the order of provided annotation sets to establish in priority in the matching in case there are more than one match determined.

The presentation slide creation system can include a process for creating a slide containing high-quality images. The process can include retrieving a selected page in the source document and converting, for example, by the graphics process, the selected page from a source format to an image in an image format (such as JPG). Image file formats are standardized file formats for organizing and storing digital images. The format may store the image in an uncompressed, a compressed, or a vector format. Image files (or images) are composed of digital data in one of these formats that can be restored for use on a computer display or printer. The image can then be stored by the system in memory (e.g., non-volatile memory) as a new file. As part of generating a resultant slide, the process retrieves the image, processes the image by extracting a section of the image, and inserts the section into a corresponding section of the slide elements. In other words, the process pulls a copy of the page from a source document and converts that page into an image (a file having a format for displaying and editing images). The image can be saved in the resolution that is generated, which provides processing and display advantages. It should be understood that a section of a page or image is being used to refer to a section of a page or image that a user selected to be of focused interest by way of a user annotation.

The presentation slide creation system can also process the image to further improve on the display quality of slide elements. The improvement relates to a process for being able to add color highlighting or background to text or other type of item in an image. The process can position the highlighting behind the text or other type of item in an image. In particular, known conventional slide creation applications have little or no capability for providing this feature. The presentation slide creation system includes a feature in which at least a section of an image is retrieved and processed by examining color information. The color information is used by the presentation slide creation system to automatically differentiate (e.g., at a pixel-by-pixel level) between the two types of displayed areas in an image (e.g., areas of an image). In the context of an image that is an image of a page of a document containing written paragraphs, the system would be able to process the image and in processing, differentiate the background (typically the color white, representing the color of an actual page) with the text that is on the page. The system removes the detected background areas from the image resulting in a revised image or image section and saves the result for use in creating slides. The removal of the background permits the image to be used in the slide without having its original background (e.g., a color background for text documents) included in the slide when a slide element is generated that contains that section or image. This permits the slide creation application to apply other types of background, e.g. a highlight color, cross-hatching, or shading, to portions of the revised image. For example, in operation, after removing the background color, the system would be able to add a graphical shape (e.g., a rectangle with a fill color in yellow) to be over certain text in the image that was designated by a user annotation as being highlighted and the system would also perform an operation to move the graphical shape "back" to be positioned behind that certain text. With this process, for example, the slide creation application can convert text that was highlighted with yellow highlight in a PDF document to also be highlighted (highlighted in the same way) in the corresponding slide element that contains that excerpt.

As part of the graphics process, the slide creation application can have the capability to determine what adaptations should be applied to slide elements. As such, if a section of an image is too large or too small with respect to the determined size of the image section in the slide, the graphics process can generate a scaled version of a section that is stored in an image format (and/or processed to remove background) and inserts the scaled version into the corresponding one of the slide elements.

If desired, the slide creation application, such as the graphics process, can first generate an annotation set that includes information that can be converted into individual slide elements. The annotation set is preferably defined to have a data structure that includes an image or a link to an image (e.g., scaled or original high resolution image of a page). The graphics process can use the annotation set as a base set of information for current slide or future slides. The graphics process can receive and use the annotation information in the annotation set and other information, as described herein, to decide what the arrangement and properties of slide elements and a corresponding slide should be, and in response, produces the slide elements and the corresponding slide that contains the slide elements. The graphics process can also analyze and determine the position that the slide element is to have in the resulting slide. The graphics process can also incorporate the image into the slide element.

The presentation slide creation system can be implemented as resident software or as software as a service-type application using a server that is available on the Internet, a local area network (LAN), a virtual private network (VPN) or other such network environment.

In an embodiment in which the graphics process is at least partially implemented on a server, the graphics process and slide creation application can be configured to distribute the processing between a remote location at a server and the client device and can be configured to protect from user content being transmitted to the server.

In such embodiments, the slide creation application can be configured to block user-selected document content from being transmitted over the Internet connection.

More specifically, the presentation slide creation application on the computer (the client device) generates the resultant slide without transmitting the user-selected document content to the server (e.g., it would not transmit the excerpt, source document, page of source document, or image of the page that contains the excerpt to the server). This can be performed by having the graphics process on the server perform its operation based on spatial and size information and having the client device separately perform image transformation and/or scaling of user content in accordance with information received from the graphics process.

In other words, the slide creation application can be configured to transmit information related to graphics (information that defines or communicates graphics-related characteristics) to the server and prevents user content from being transmitted to the server (e.g., prevents the user content from being transmitted to the server with the information related to graphics). This prevents information that is intended by the user to be displayed as viewable content in slides (e.g., text, images, or video) from being shared outside of the client device. This feature provides a valuable security mechanism in that confidential or sensitive information is not shared by the client device with the server side of the graphics processing. The server side, which can be a software as a service website provided by a vendor, is preferably configured to provide its functionality and operate without receiving or having access to confidential or sensitive information that is stored on or available to the client device.

As part of this process, as a matter of clarification, the server side can receive an annotation set or information relating spatial characteristics of user annotations from the client device but without receiving the associated written text, document images, documents, or pictures. The received information can also communicate type information with respect to user annotations that can communicate a correspondence with a type of slide element (e.g., citation, image section, etc.). The graphics related information that is received from the client device provides the server side with the ability to evaluate and create an arrangement for a slide based on spatial relationships and other factors such as the type of slide element and a layout specified in the a slide template.

Preferably, in the client-server based arrangement, the slide creation application on the client side is configured to permit individuals in an organization to collaborate with respect to a slide. The slide creation application would allow the client device to share slides and user content with others through the slide creation application with others within a company or group through a local network connection such as a LAN, WLAN, or other type of local network connection such as Bluetooth or similar. The application would be configured to be able to support local or intra-company sharing but would block sharing with external destinations. The application can also be configured to entirely block a user from sending user content through the application over the Internet, including not providing a user a feature that gives the ability to transmit user content over the Internet. In some embodiment, the application can be configured to permit the transmission of user content to a desired destination if the application detects that a secured connection has been established for communicating with the desired destination.

In the client-server type embodiments, the system is also configured to prevent the client device from having access to the mechanisms and processes by which the graphics process on the server accomplishes its tasks. In other words, the system is implemented to block users from being able to "see" the operation on the backend at the server.

This general approach is different from a trend towards cloud applications because it requires a first portion of the application to be installed and operating on the client device and a second portion that is installed and operating on a server over a network. In cloud applications, typically, the entire application is installed and operating on a server. In this embodiment of the present invention, only a portion of the application is on the server and that portion is preferably limited to aspects of the application that perform spatial related graphics functionality which creates, specifies, or modifies size, dimension, position, or orientation for one or more slide elements (that exist or are to be created on the client side).

Another feature relates to a "smart" or "intelligent" template. Embodiments of the present invention contemplate a new type of slide creation template. Such a template includes logic or analytical functions that can result in the template producing different slides or slide elements. This feature will sometimes be referred to as a smart template. In conventional slide creation applications, a template is a distinct application item that is used for producing new slides using the layout and other properties of the template. A smart template is configured to, in addition, have logic that reads incoming content or information for creating a slide and in response automatically produces different variations in the properties of the output slide (such as by creating variations in a specific slide element). In a practical sense, this can for example, provide a highly efficient tool that can automatically adapt to incoming content. For example, in the context of preparing slides for a litigation proceeding, the smart template can be used to automatically apply a first background color for a slide or slide element that is for presenting the defendant's case and a second background color for information related to presenting the plaintiff's case. The variations can be triggered by specifying a keyword to be found in the content or inserted in an annotation. Other ways of inputting relevant data to trigger variations are also contemplated.

In some embodiments, the slide creation application implements software classes and related features as part of the conversion process. For example, the slide creation application can define a set of software object classes with each class defining a type of slide element. As part of conversion process, the slide creation application can read an annotation or annotation set and from the content of the annotation or annotation set assign a matching software class to the annotation or annotation set. Matching can be performed using a keyword or other indicator contained within the annotation set. The software classes are used to generate objects, which are then used to generate corresponding slide elements. The classes can include software classes such as heading, citation, artwork, excerpt, etc.

The presentation slide creation system can also provide enhanced tools for managing and organizing research and related slide presentations, such as by incorporating features involving category tags. A category tag is a term or phrase assigned to an entity (e.g., an image, section of an image, document, slide) to characterize its content and which is often used to locate similar content when browsing or searching. The slide creation application can include an interactive option in which a user selectively assigns a category tag to an annotation set. The application can support various category tags and therefore, is capable of assigning various category tags to different annotation sets. If desired, as an alternative or by implication of the assignment of a category tag to an annotation set, a category tag can be assigned to a section of an image of a selected page. The application stores user-selected and assigned category tags in association with its corresponding annotation set (or section). The category tags can be configured in the application to be hierarchical category tags. As such, a reference to a category tag would be understood to encompass a subcategory tag depending on the context. This tagging can have a benefit to the user of being able to view the tagged information, but more specifically, it provides a refined level of granularity by being able to provide the ability to view tagged content at the section level (as opposed to page or document levels). This provides a useful and efficient approach in that information is displayed (or displayed with emphasis) at the level that the user who tagged the section thought to be relevant to the category associated with that category tag. The software application would be able to display the section with emphasis (e.g., a graphical box) that would allow the user to see the relevant text and its location with the corresponding page.

The system can include a display feature in which a display is generated illustrating a view of user-defined hierarchical category tags. This feature includes an option to select one of the category tags and in response, corresponding sections of images (e.g., from different documents) that were assigned that category tag are displayed together for viewing by the user. This way a user can quickly identify and review relevant sections, down to a particular page section, to evaluate the state of a presentation project under that category.

If not explicitly described herein, it would be understood by those ordinary skill in the art from the descriptions and figures of embodiments of the present invention, that a GUI is included that provides an interactive interface (e.g., FIG. 21) for a user by way of a display generated on a screen such as on a user's computer monitor or smartphone touchscreen. Other embodiments are also contemplated. The GUI permits the user to gain the benefit of the system by interacting with particular features. For example, in an embodiment involving a client-server arrangement, the GUI can be displayed as part of a slide-creation application on the client side of the arrangement. This can for example be a web-based browser interface or a resident application. In implementation, for example, the GUI includes an interactive template option that provides the user with the opportunity to select one or more templates. It should be understood that template selection is not always required. The GUI can include an interactive annotation option that provides the user with the opportunity to submit one or more annotations or annotation sets. The GUI provides the user with interactive options that provides the user with the ability to select settings or operate the application such as executing the conversion process, loading/saving templates, loading documents, previewing slides, moving elements on the a slide (in a preview), creating files for a resultant slide, adding graphical elements, selecting colors, or other features. In response to the user selecting a template and an annotation (or annotation set), the GUI can preferably display a preview of a resulting slide (based on the template and annotation, as described herein) and create a slide (e.g., when a "make" option is selected by the user, as described in examples herein). Thus, for example, a user can locally interact with the GM in using the processes of the application.

There can also be simpler version of the interactive interface. As illustratively described herein, there can be a selectable button (e.g., installed within another application) or the ability to drag and drop annotations into virtual container (see, e.g., FIGS. 7 and 8). The slide creation application can, in response, receive the annotation set, perform described processing on a server (a cloud service), and receive (and store) a resulting slide. Client-server arrangement are also described in other portion of the specification herein.

In a preferred embodiment, a system is provided that at the onset produces a resultant slide using programmable spatial slide rules and user content. The resulting slide is created automatically and when created it is configured to have a "perfect" arrangement. Perfect can refer to various considerations that will impact the quality and professionalism of a slide or a sequence of slides. Simply scaling by itself for example to achieve a certain result may be intuitive but the result can be inadequate with respect to quality. Considerations such as this can be addressed using tools or programmable spatial slide rules described herein. In preferred embodiments, a system can include a computer and a software application implemented on the computer, which configures the computer to retrieve an annotation set, representing a user-annotation with respect to a source document, from non-volatile memory or another software application, wherein a data structure defines the annotation set to include features comprising a first portion comprising annotation data representing the user annotation applied to a page of the source document and a second portion comprising an image or a link to an image from the source document; process information in the annotation data, and in response; generate one or more spatial properties of the user annotation including automatically determining a geometric shape of the use-annotation; retrieve a set of programmed spatial slide presentation rules that manage spatial relationship between slide elements and for slide elements within a slide; and automatically produce a new presentation slide for the annotation set by automatically establishing a corresponding relationship between the annotation set and one of the slide elements and simultaneously defining a spatial size and position for each of the slide elements as a function of a set of programmed spatial slide presentation rules and the determined geometric shape of the user-annotation.

The software application can further configure the computer to interactively select a scaler area and have the set of programmed spatial slide presentation rules applied to the selected scaler area and the user annotation. The system can be implemented such that the application further configures the computer to perform computer-implemented steps comprising converting user annotations from a first file format to a second file format including customized conversions that depend on information in user annotations.

The application can also configure the computer to convert a location of an individual user annotation in a first file format to a spatial location in a page in a second file format. The application can further configure the computer to convert a selected page from a source document format to an image in an image format, store the image in memory as a new file, and as part of producing the presentation slide, retrieve the image, process the image by extracting a section of the image and insert the section into a corresponding one of the slide elements. The embodiments as described include automated process that can include or be divided into multiple modules that can run in parallel or in the background to create multiple slides. As such in some embodiments, slides are created in parallel for the same annotation to simultaneously provide different resulting slides as different versions of slides for the user to view, compare, and ultimately select to use. The slide creation application can create a collection or collections of slides and display or provide the collection in or through a GUI, If desired, the GUI provides the interactive ability to receive and display the collection. These collections can include collections created using templates the user had previously chosen, new or featured templates, templates designed from recommended variations based on deduced intent, or a complete collection of all available templates. Because designing slides is often an iterative process of trying out designs to see the effect and then revising the design and trying a variation, the ability to try several variations at once can help one create better slides more quickly. This provides processing and performance efficiencies and advantages. The objective is to operate in such a way that multiple different layouts or arrangement for a slide based on annotation set are provided to the user. The processing to create the slides does not necessarily have to be all in parallel but the result due to the speed of the server and delivery of the slide can appear to be so to the user. The resulting slides are provided approximately all at the same time so that the user can view and compare them.

This summary is provided as a reference and should be understood to be non-limiting. Additional inventions and inventive features are evident and are described in the detailed description and the claims.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which:

FIG. 4 is an illustrative process and slide in accordance with one or more embodiments of the present invention;

FIG. 5 is an illustrative process and slide in accordance with one or more embodiments of the present invention;

FIG. 18B illustrates a scaler feature in accordance with one or more embodiments of the present invention;

Figure 1:
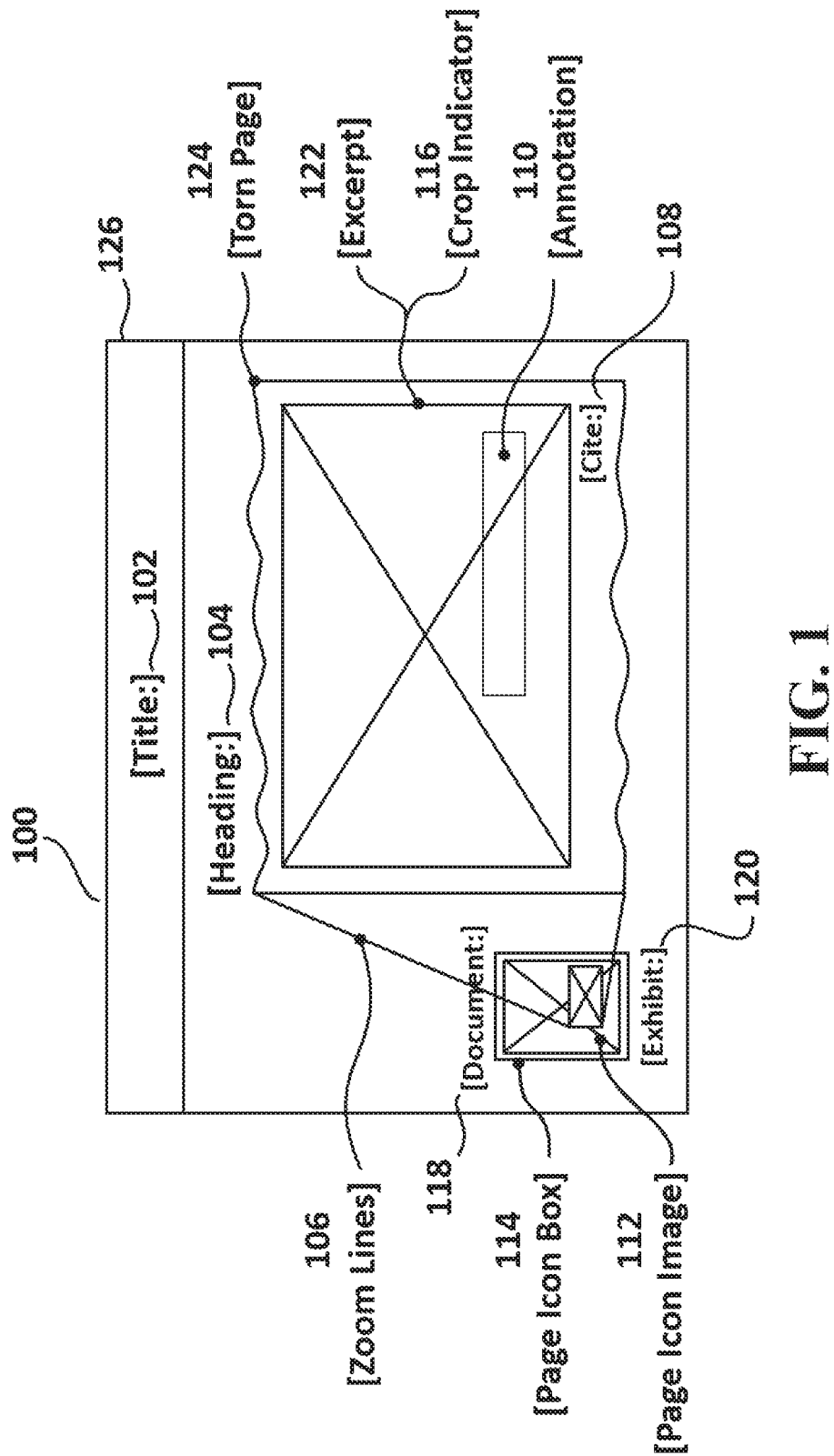
FIG. 1 is a diagrammatic representation of a slide of a system in accordance with one or more embodiments of the present invention.

Certain examples and embodiments have other features that are one of in addition to and in lieu of the features illustrated in the above-referenced figures. These and other features are detailed below with reference to the above-referenced figures.

DETAILED DESCRIPTION OF THE PREFERRED EMBODIMENTS

In accordance with principles of the present inventions, a system is provided that makes many advances and solves technical problems in the field of presentation technology, in particular in generating presentation slides.

As discussed above, slide presentation software applications are a particular category of software applications that has existed for many years for the purpose of creating, editing, storing, and playing presentations. Applications in this category are particularly configured and directed to slide presentations as opposed to other types of applications such as word processing or spreadsheet applications. Slide presentation applications provide a slide-by-slide mechanism for creating and saving presentations. Once created, a presentation slide or slide deck can be played within the application such that slides are displayed with the graphical and illustrative qualities defined for each slide during the creation process. Slides can be printed to a PDF file to show their graphical image or converted to other formats. Slide elements and slides can have various properties. For example, slide presentation applications provide options to a user for creating various slide elements, configuring slide elements (e.g., shape, size, animation, etc.), and positioning elements in different arrangements. Other properties can, for example, include fill color, stroke color, stroke width, and shadow. Slide templates can store properties (e.g., all properties) for the slide and for slide elements specified to be in that template. The properties include an initial set of proposed slide elements and their position, size, and orientation on the slide that would be ultimately produced. As generally understood, a template can be stored for reuse in creating new slides.

As a matter of reference, the following description first describes, by way of example, various terms and structures that are pertinent to the overall discussion.

The terms "presentation slide creation application" or "slide creation application" refer to a software application that is configured to create or modify slides. The term "slide presentation application" refers to an application that can play (present) a slide presentation and in some cases, it includes a presentation slide creation application. As a matter of general discussion, the term "conventional slide presentation application" is used herein to refer to prior art applications such as Microsoft PowerPoint. Also, some of embodiments of the present invention are directed to a software application or module that is configured to supplement another application. In those situations, the terms "third party" or "external" are used in referring to the other application. The term "system" is used to at least refer to a computer (including volatile and non-volatile memory) or other supporting hardware and software.

With reference now to FIG. 1, slide 100 is shown that contains different slide elements. Slide 100 is a rendering of a slide as it would be displayed or played within a slide presentation application. Slide 100 can be configured to include slide elements such as a title, bullets, image (imported image), animation, or graphic box.

A "tearout" is also a pertinent concept that is described and defined. A tearout is a group of slide elements that includes an excerpt from an image or page (e.g., a PDF document page) from a source file. The image or page is user content that the person creating a slide would like to show to the audience. A tearout presents a portion of the image to the viewer in a highlighted fashion. In particular, a tearout can be used to direct focus to a particular portion in a page of an important document. This is sometimes used to present a specific or direct source for a point that is being presented as part of the slide presentation. The image excerpt is usually enlarged so that the content can be more easily read or seen. Tearouts can enhance credibility of the presenter or presentation because tearouts show the underlying source for a position directly.

It would be understood that documents such as papers, publications, legal decisions, or research results in the electronic world are primarily stored as PDFs. Other formats or types of documents are contemplated.

Sometimes tearouts are referred to as callouts, blowups, blowouts, sidebars, or breakouts. A tearout can include a single excerpt or multiple excerpts from a single document or multiple excerpts from multiple documents.

When discussed in connection with a slide, the term "tearout" is also meant to communicate the slide elements that are generated and configured in a slide to present the image excerpt or document portion, in highlighted fashion, to a viewer looking at the slide. For simplicity, the content that is the focus of the tearout will be referred to as an image excerpt. For example, slide 100 presents a tearout comprising image excerpt 122. The text shown in brackets in the figure is provided for general guidance and would not exist in the actual slide presentation except as noted below. It should be understood that in other slides, the similar approach is used. Slide 100 also contains title 102, heading 104, graphical zoom lines 106, cite 108, annotation 110, page icon image 112, page icon box 114, crop indicator 116, document label 118, label 120, and torn page background graphic 124. If desired, text is displayed in the slide at the identified location for title 102, heading 104, document label 118, cite 108, and label 120. Slide 100 is for a legal presentation and specifies label 120 to be an exhibit label 120. Cite 108 can specify the publication or document, line, paragraph, or page from which the image excerpt was referenced. The slide elements are arranged on a page 126 having a particular size such as Letter or A4.

Background box or torn-page image 124 behind the image excerpt helps separate the image from the other slide elements and can be used to visually convey information. For example, torn-page image background 124 can be used to remind the viewer that the excerpt is from a particular document. In litigation and other uses, this is a valuable tool that is used to illustrate the underlying merits of a presentation point such as an argument or a conclusion. A background box might have a particular color that helps to correlate or distinguish the content of an image excerpt that lies over that background box. For instance, in litigation, a stroke of one color might convey that the source image is from a specific party as opposed to a boxed excerpt with a different color stroke being from a different party.

In a legal presentation, cite 108 is used to identify the source and location of an excerpt within a source document. There can be a cite for each image excerpt or a combined cite for all image excerpts that are included in the tearout. It is common to have a heading, such as heading 104, that sits above the tearout.

Annotations, such as annotation 110, are shapes and lines such as rectangles, ovals, polygons, highlighting, underlining, and strikethrough that emphasize or communicate information about excerpt 122. Typically, this refers to a portion of an image excerpt that includes a sentence or phrase highlighted by a user for emphasis and presentation. The term "annotation" may have different meanings depending on context. An annotation as discussed in the context of a slide element or a slide is in reference to a set of slide elements (one or more slide elements) that forms a representation of an annotation added or identified by a user in a page of a source document. For example, annotation 110, discussed in the context of slide 100, is one or more slide elements that a slide creation application creates to illustrate an annotation that was placed by a user in a source document. For example, the particular annotation was inserted by a user in a source document over a portion of a selected image excerpt and saved in the file format of the source document. The slide creation application converts that annotation in the first file format to an annotation set and/or ultimately instructions or code in a second file format (such as PowerPoint or intermediary format) in order to transform that annotation to be displayed in the slide. This conversion includes performing the spatial and location transformation in order to properly align the created slide elements for the annotation over the same portion of the image excerpt as originally marked by the user in the source document. The term "user annotation" is typically used to further emphasize that an annotation was added by a user to source document.

An "icon" of the source page or pages, such as source page icon image 112, may be used and may be connected with lines, a gradient polygon shape, or a carrot to show where the image excerpt came from. Crop indicators, such as crop indicator 116, may be located beneath the excerpt and on the icon to identify where each excerpt originated. For example, someone viewing the presentation can use the icon as reference when looking at a printout of the source to see where the information was taken from and what contextual information may have been left out. A cite can be text that communicates a citation for a source document (e.g., page number and document information).

Figures 2, 3:
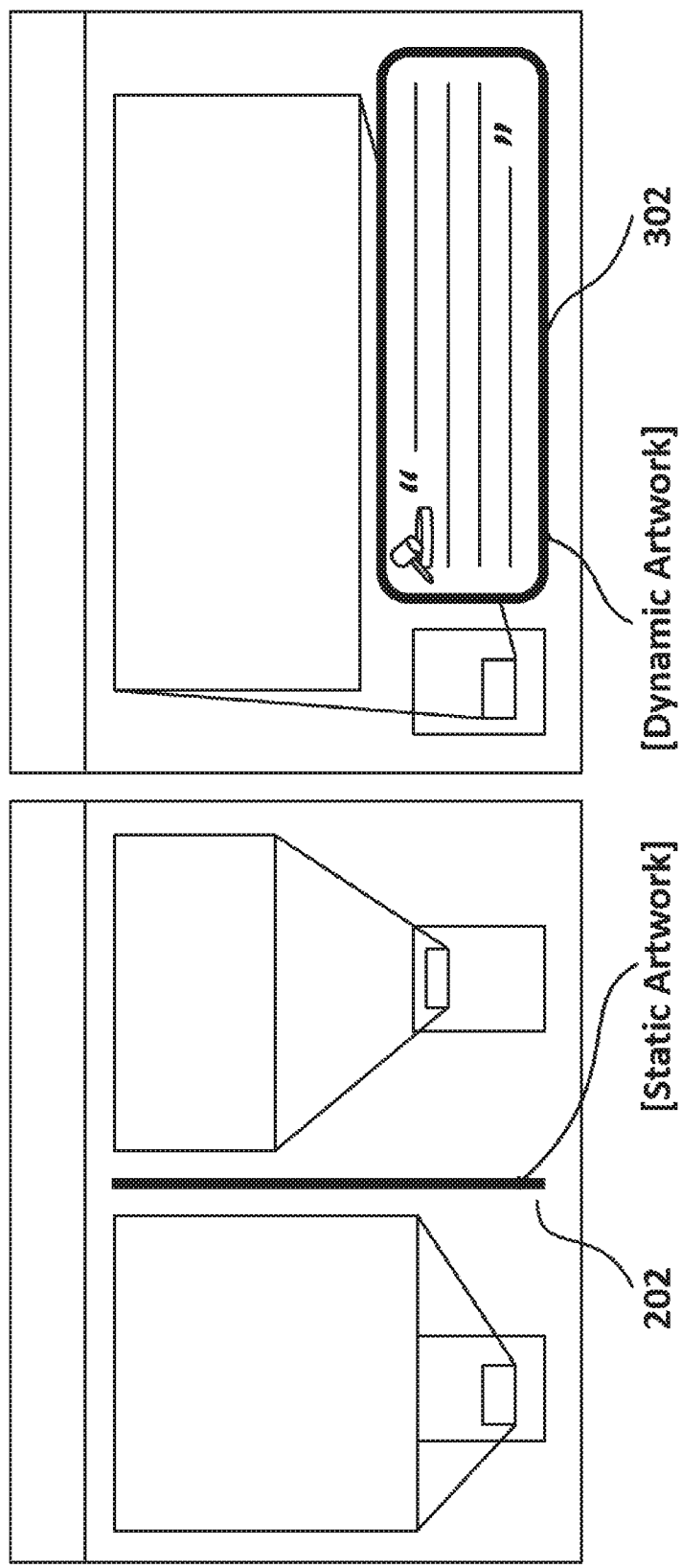
FIG. 2 is a diagrammatic representation of a slide related to FIG. 1 in accordance with one or more embodiments of the present invention.
FIG. 3 is a diagrammatic representation of a slide related to FIG. 1 in accordance with one or more embodiments of the present invention.

A slide may include multiple tearouts and will usually include artwork in addition to tearouts. Artwork can be static or dynamic. Static artwork largely stays the same regardless of the content and annotations that occupy the same slide. Some examples of static artwork are design elements like divider lines (e.g., divider line 202 in FIG. 2), shaded areas, and colored bars. These static elements are often used to convey that the content information is alike or different by using layout and color. Other examples of static artwork are pictures and illustrations.

Dynamic artwork includes, e.g., subtitles, bullet lists, exhibit stickers, quotes (e.g., law quote box 302 in FIG. 3), footers, and illustrations. Dynamic artwork is a container that contains dynamic content and changes form based on the content that fills it. Dynamic artwork can contain or carry user-generated or selected content that communicates textual information, image, or graphical content when played or presented. The dynamic artwork can be implemented as a slide element that has graphical characteristics that can be varied as part of defining a presentation slide. The size, location, outline, font, coloring, content, or animation of dynamic artwork can be modified.

In general, a reference to a slide or a presentation slide is in reference to a file that is stored in memory in the format that is in accordance with or compatible with a native format of a slide presentation application for creating and editing presentation slides. It would be understood that the file can include a sequence of slides for use as a slide deck. To clarify, embodiments of the slide creation application of the present invention are implemented to be compatible and interoperate with a third party or external slide creation and presentation application. This is performed at least in one way by creating slides and slide elements in the file format used by an third party or existing slide creation and presentation applications such as PowerPoint. As such, embodiments of the present invention provide a "gateway" or complementary tool that is designed to generate a slide for use or play in another application.

A related issue is that conventional slide creation applications are widely available and familiar to users. In this field, users are much more likely to adopt a new tool if it is provided with the convenience to easily interact or integrate with a conventional slide creation application that they are familiar with.

Embodiments of the present inventions are directed to the field of litigation support. In practice, there is a dedicated field or industry of specialists that assist lawyers in creating and presenting slides as part of court proceedings. The slides are created for use in hearings, trials, or other legal proceedings as a way to present legal or factual information to the judge or jury. Slides have become widely used by lawyers as a standard tool for presenting a case. There are different evidentiary rules that may apply and control what can be included in a slide. Arguments or persuasive information in a slide (potentially in addition to the law or facts) can be used in front of a judge or jury as what is referred to as "demonstrative evidence." Such slides or other similar items that fall into that category are also referred to as "demonstratives." The principle behind it being that demonstrative evidence can be presented (visually) to a jury, but it is not entered into evidence ("admissible evidence") because it contains more than just the facts. In some situations, the parties and/or the court can agree to allow demonstratives such as a presentation slide to be made available to jurors during deliberation. Embodiments of the present invention are particularly suited for the preparation of demonstrative slides but are also obviously applicable to many other areas.

As a matter of further clarification in the context of application in the field of litigation, FIGS. 4 and 5 are provided to potentially illustrate by way of example a distinction between what would be considered demonstrative evidence versus admissible evidence. FIG. 4 provides an illustrative slide 402 that presents admissible evidence. As shown, slide 402 contains two image excerpts from a source document without text or arguments. It simply communicates the content of the excerpt from the source document. FIG. 5 is an illustrative demonstrative presentation slide 502 that would be considered demonstrative evidence. As shown in slide 502, slide elements are included that include arguments or remarks related to the two images from the source document. The slide elements in slide 502 are dynamic artwork that are more effective, in comparison, to slide elements in slide 402 of FIG. 4 in communicating a point such as an argument to the viewer.

As would be understood, embodiments of the present invention relate to software applications, systems, tools, or features that improve on existing systems for creating and editing presentation slides. The inventions can be used in several different environments or in a complimentary combination of environments, including a web app, native mobile app, PC resident application, PowerPoint add-in, and Acrobat plugin. Embodiments of the present invention can be implemented in a collaborative environment such that to allow the sharing of source document and created slides or in a client-server environment, as described earlier, in which client documents are not transmitted to the server and the client system does not have access to the mechanisms and process by which the graphics engine accomplishes its tasks.

Figure 6:
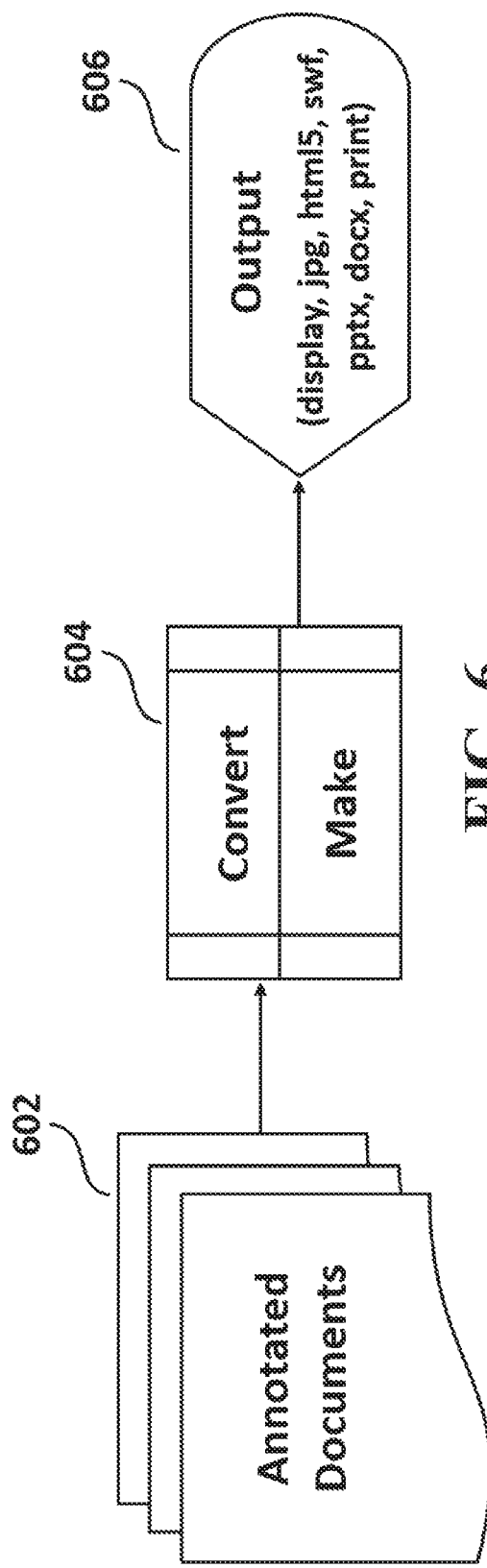
FIG. 6 illustrates a process in accordance with one or more embodiments of the present invention.
Figure 7:
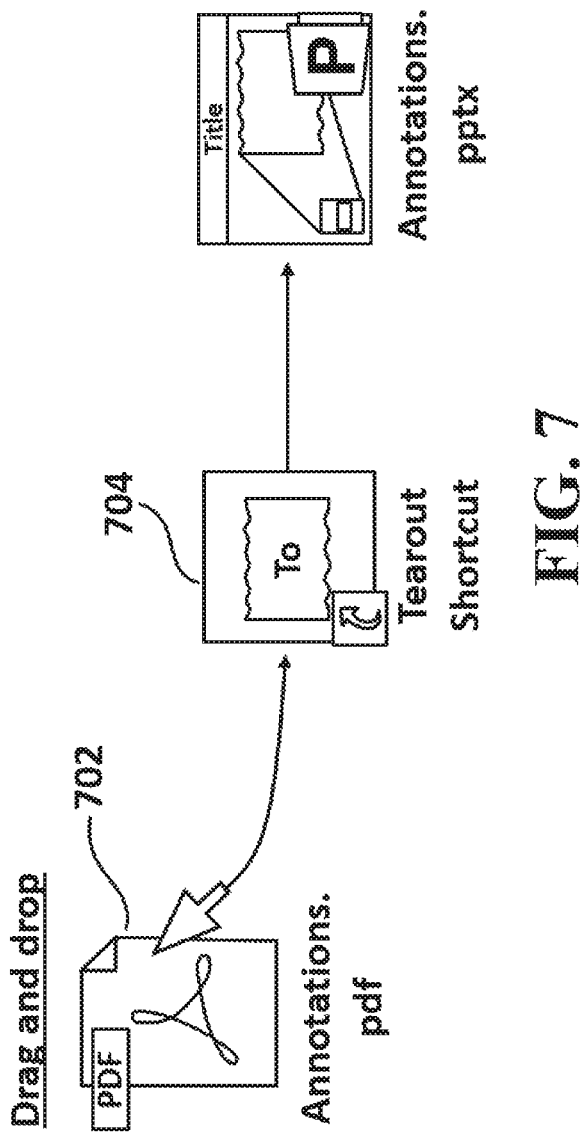
FIG. 7 illustrates an implementation of the process of FIG. 6 in accordance with one or more embodiments of the present invention.
Figure 8:
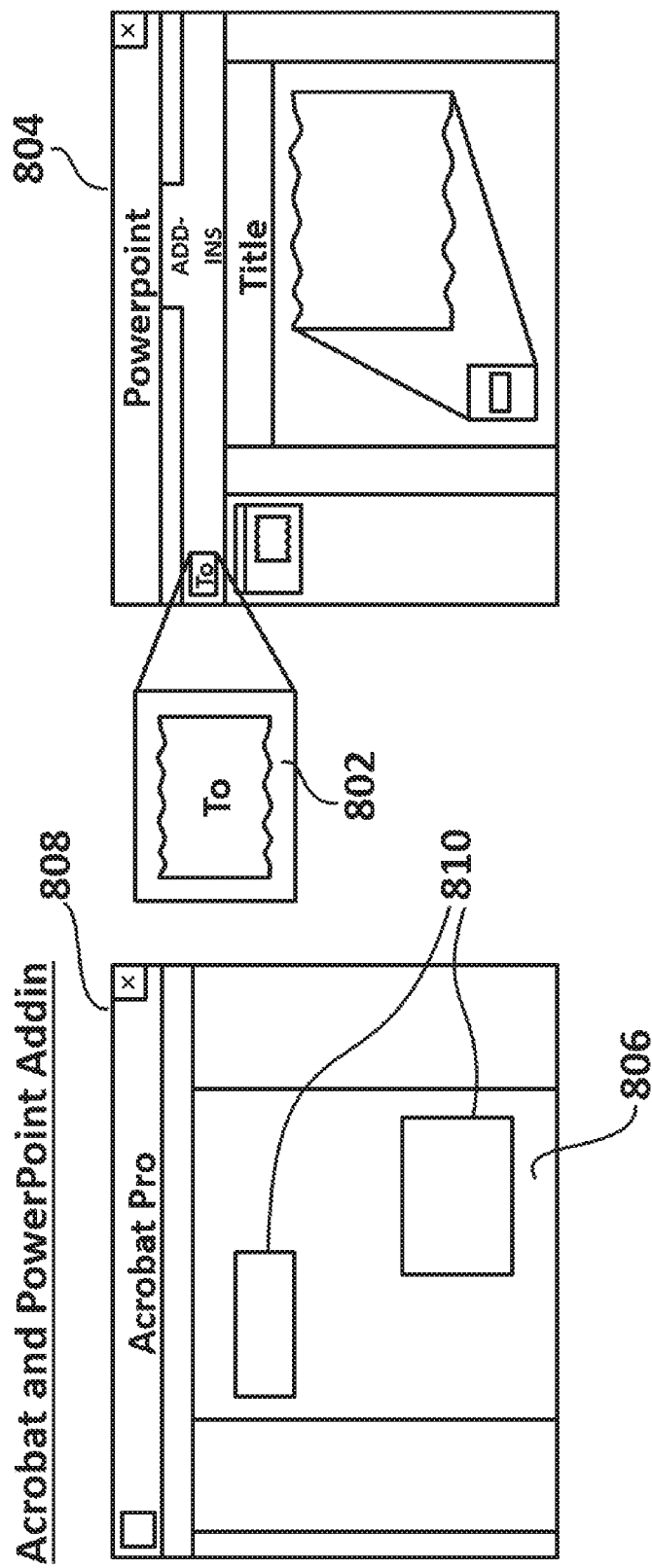
FIG. 8 is a diagrammatic representation of a slide in accordance with one or more embodiments of the present invention.

FIGS. 6-8 illustrate certain aspects of the embodiments of the present invention. FIG. 6 illustrates a process in which user-annotated documents 602 are retrieved and operated upon by the slide creation application implementing convert/make process 604. As would be understood, user-annotated documents 602 refers to source documents that contain annotations that have been added over one or more pages of the documents. In response to an annotated document being processed by convert/make process 602, output 606 is generated. Annotated document 602 can, for example, be a PDF document or an individual page in a PDF document. User annotations may have been added over a PDF page using, for example, comment or annotations tools that are resident in a PDF viewing application such as Adobe Acrobat Reader. User annotations may be added in other ways. These annotations can, for example, include a highlight (e.g., created using a highlighter tool); a graphical box that surrounds an area of text or image of interest, or textual commands inserted in comment boxes (such as comment boxes in Adobe Acrobat Reader). As discussed herein, an annotation on a page can be converted to an "annotation set" (or a group of annotations on a page can be converted to an "annotation set"). Although not illustrated in this figure, embodiments of the slide creation system are configured to provide hierarchical tagging in that the user can tag an annotation set using a "tree tag" (meaning a searchable hierarchical code).

Convert/make process 604 processes the retrieved document such as a page and the user-added annotations and automatically generates output 606, which can be a file or group of tiles. The output file can, for example, be created to be in PowerPoint, or other formats such as jpg, html5, swf, docx, or print file. The output of the system can be a presentation slide that contains a tearout that is built; as it should be understood—automatically, from a root; the source document, and from the annotations added and saved in Adobe Acrobat Reader or Adobe Acrobat Pro (collectively, "Adobe Acrobat"), in conformance with coding and formatting of Adobe Acrobat. The system can build a slide presenting a tearout from an annotation set associated with a single annotation or from an annotation set group for a set of ordered annotations. A group of annotation sets, e.g., appearing on sequential pages in a document; taken together form an "annotation set group." In the case of an annotation set group, the order is captured in the annotation set so as to be used in the sequence in which image excerpts or other slide elements are included in a slide. Output 606 may include dynamic artwork that has been populated as well as static artwork. Depending on context, it would be understood that a discussion about an annotation set is also applicable to an annotation set group.

Convert/make process 604 can include an initial convert operation in which an annotation set is produced from the user annotation(s) in an annotated document. The resultant annotation set can then be operated upon to make a slide in the format of a desired destination application for the slide such as a PowerPoint file format.

FIG. 7 shows an implementation of FIG. 6 in which a file, annotations.pdf 702, is selected on a computer (e.g., from the desktop) and dragged into icon 704. Icon 704 can be a shortcut to the slide creation application on the computer. In response to the drag and drop action, the slide creation system automatically generates an output, which in this case is a PowerPoint presentation having at least one slide containing a tearout. If annotations.pdf 702 has multiple pages with annotations, the system may create multiple slides. In general, the feature can be also implemented in systems which have touch screen technology and/or voice input, so actions such as drag and drop, can be done using gestures and voice commands.

In another implementation of the system, an add-in or plug-in is implemented for providing a slide creation application in Adobe Acrobat, PowerPoint, or both. For example, in FIG. 8, interactive button 802 is installed and accessible within the PowerPoint application window 804. In response to a user selecting button 802, the system identifies a page in the current PDF document 806 that is open in Adobe Acrobat 808, retrieves the current active page, specifically PDF page 806, including annotations 810 that were added by the user in Adobe Acrobat 808.

Figure 9:
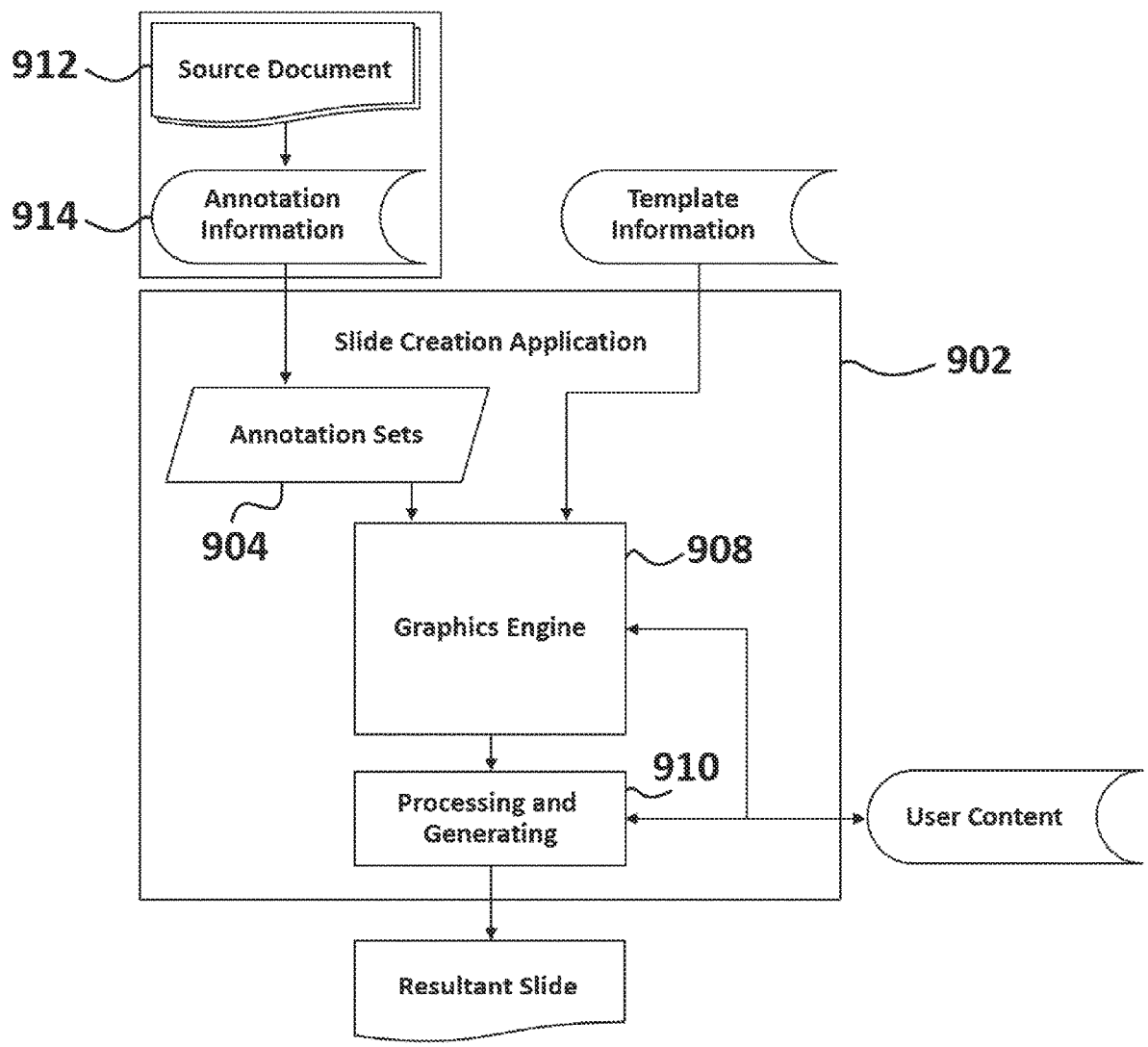
FIG. 9 illustrates a flowchart that may be followed in accordance with one or more embodiments of the present invention.

With reference now to FIG. 9, a presentation slide creation system and related applications, software modules, and processes are illustratively shown with respect to some embodiments of the present invention. Slide creation application 902 can include a number of components and can be implemented on a single computer or multiple computers. Slide creation application 902 is saved for retrieval and used in non-volatile memory. When application 902 is running, the system may use volatile or non-volatile memory. Slide creation application 902 includes annotation set module 904, graphics engine 908, and processing and generating module 910.

A module is in reference to a software module that can be an independent file or part of a larger file. If desired, one or more modules can be implemented as hardware such as an ASIC.

Slide creation application 902 identifies or receives a template (e.g., user-selected template) that defines slide elements and related properties such as the layout of the slide elements for creating new slides. For example, the template can define static artwork or dynamic artwork and their arrangement on a slide. As mentioned above, the template an also be a smart template. In operation, application 902 retrieves source document 912 and locates user-added annotation information 914 from source document 912. Annotation set module 904 receives the located annotation information and analyzes it to identify one or more user-inserted annotations, which were added over a selected page from within the source document. Annotation set module 904 converts the one or more identified user-inserted annotations from a first file format (or native format of the source document) into one or more corresponding annotation sets in a second format. For example, annotations inserted by a user in Adobe Acrobat and saved in that format are read by annotation set module 904 and the information is interpreted to identify slide elements. Annotation set module 904 converts an annotation to an annotation set in another file format (e.g., from PDF to xfdf). In some embodiments, if desired, annotation set module 904 can be configured to convert the annotation to a slide element in the format or file format used by a slide creation application such as an external or third party slide creation application.

Annotation set module 904, in other words, includes a conversion process. The implemented conversion generates slide elements from the user annotations. As explained, the conversion process can include a direct conversion or an intelligent or customized conversion in which the application recognizes annotations to mean different things. It is also possible for the user annotations that are located and translated to include text for the purpose of being displayed in corresponding slide elements. Annotation set module 904 can appropriately analyze and include the text in a corresponding annotation set or if desired, in some embodiments slide element. Such text can be text added by a user as a comment within a "comment bubble" added over a document page in the application associated with the first file format. A word or phrase can be added into a source document, which has instructional meaning (e.g., a command) to the annotation set module 904, but is simply understood as simple text in the source document or the native application of the source document.

Annotation set module 904 can include a procedure that translates a location of a user annotation in the first file format to a spatial location in a page in the second file format. For example, annotation set module 904 can read a user annotation that identifies a section of a page in a source document, wherein the user annotation is in a first file format (such as PDF) and transforms that spatial location on the page to a spatial location in the image in a second file format (such as PowerPoint). If desired, such conversions such as spatial transformations can be performed at a later stage where in an initial stage, the conversion can relate to creating annotation sets that contain the spatial properties of a user annotation as recorded in the source document or native application of the source document.

To further clarify, different applications and file formats can use a different method for defining a spatial location of points in a page or image. A conversion process is performed to accurately convert the location from the first application, which uses one type of coordinate system, to a location in a page in the second application, which uses a different coordinate system. The issue can be important when a system is creating a slide that displays a location of an annotation within an image or page and without the proper conversion (e.g., between coordinates, for example), the slide would not provide an accurate depiction. This spatial transformation can be implemented in the annotation set module 904 or if desired in other modules. A first step in the process can be for annotation set module 904 to convert a user annotation to an annotation set that may be in a file format that is used for ultimately generating slide elements. The annotation set if desired can include as part of this first step the spatial conversion or the relevant conversion can be implemented at a later stage.

The conversion process can also include a process in which annotation sets are converted into software objects that are used to generate slide elements or slides. The slide creation application can define a set of software classes that corresponding to different types of slide elements. The slide creation application is preferably configured to receive annotation sets and read the content of an annotation set and in response, match the annotation to one of the different types of software classes. In response, the slide creation application applies the information in the annotation set and the software class to creating an object in that software class that has specific properties defined, at least in part, from the information in the annotation set.

Graphics engine 908 provides graphics and slide creation (and modification) capabilities. Graphics engine 908 can provide slide creation features that are improvements to existing slide creation applications and features that are not available in conventional slide creation and presentation applications. For example, graphics engine 908 provides features not currently available in PowerPoint. Graphics engine 908 can define graphics characteristics based on annotations that when the graphics characteristics are applied result in drawing graphical content on a presentation slide.

Graphics engine 908 can be configured to provide many different graphics-related functions. A primary graphics function described herein relates to producing slides and slide elements. Other functions can relate to providing enhanced graphics features such as features related to animation. With respect to producing slides or slide elements, graphics engine 908, in some embodiments, is configured to receive one or more annotation sets from annotation set module 904 and in response produce a slide and corresponding slide elements (that are in a different file format than the annotation set and the source document). Graphics engine 908 can receive annotation sets containing spatial conversions (e.g., size, location, coordinate system, orientation) or without containing such information where graphics engine 908 would perform the conversions. Either way, graphics engine 908 performs processing operations, described below, that produce a slide for use in the slide creation application. Graphics engine 908, if desired, is configured to receive initial versions of slide elements from another module such as annotation set module 904. Graphics engine 908 is also configured to provide real time revisions and updates of a slide and slide elements contained therein in response to a user interacting with the slide (or draft representation of the slide) through a GUI such as a preview screen (e.g., by moving or resizing a slide element). If desired, this is provided continuously as a user interacts with slide elements if desired.

Slide creation application 902 can also include as part of the conversion process additional features for appropriately locating the position of certain text of interest on a page of a document. For example, a user may want to specify a certain portion of a page to be highlighted as language that is contained as an excerpt in a slide. The user or a document may specify the position in terms typically used to help a reader find that text in the source document (e.g., a citation). Slide creation application 902 can perform optical character recognition (e.g., by using another application) or can receive a document or page of a document that has had its content recognized using optical character recognition ("OCR"). Slide creation application 902 can use size and spatial information that is known or extracted from the page (e.g., from OCR), including the height and line spacing of the text on the page, margin information, and page length and width (e.g., using pixels) to identify the spatial shape and location on the page that contains the desired content. Slide creation application 902 can then, for example, use that information (identified for example in the page of the source document) to convert that spatial and size information for the position of the text in the first page in a first file format to spatial size information in the destination format. This way, when the image is extracted, the appropriate position is used even though the two applications may use different coordinate systems.

Graphics engine 908 can be configured in some embodiments to perform its operation by receiving annotation sets and other information and from that information create a new slide and corresponding new slide elements that graphics engine 908 positions in the slide based on functionality such as to avoid spatial conflicts and/or applying programmed spatial slide presentation rules. In some embodiments, graphics engine 908 receives slide elements opposed to annotation sets) and performs the same functionality to modify an existing slide or create a new slide.

Graphics engine 908 uses annotation sets (or already defined slide elements) and the related layout and properties (from the template) to determine and assign new graphical characteristics to one or more corresponding slide elements in conformance with the user-selected template based on: graphical characteristics of the annotation sets, which would correspond to graphical characteristics of intended slide elements that are to be created (or one or more existing slide elements), graphical interrelationships between the intended slide elements (or existing slide elements) such as the related layout, and graphical characteristics of a page size for the slide. As a matter of clarification, the use of the word "graphical" should in general be understood to include "spatial." Graphics engine 908 determines and assigns the new graphical characteristics using these varied and different sets of data. In this process, graphics engine 908 adapts graphical characteristics of the one or more corresponding slide elements to graphical characteristics of the template within a page size of the slide. For example, in the embodiment in which graphics engine 908 receives one or more annotation sets, graphics engine reads and processes information in the annotation set(s) and other data such as the template and in response, determines size, location, or other properties that create corresponding slide elements and a corresponding slide containing the slide elements having spatial characteristics that avoid spatial conflicts and/or meet certain programmed spatial slide presentation rules. "Programmed spatial slide presentation rules" refers to a set of programmed instructions that manage spatial relationship between slide elements and for slide elements within a slide. The programmed spatial slide presentation rules can specify a minimum distance between slide elements (or different types of slide elements), position of slide elements within specified margins on the slide, or other setting that are desired. Programmed spatial slide presentation rules include rules that are applied to avoid spatial conflicts, but can also include other programmed rules that can go beyond spatial conflicts such as limits on scaling a font size to be small or too large. Programmed spatial slide presentation rules can also implement rules that optimize or implement a best fit for one an excerpt, one or more slide elements, or all slide elements for a slide. Graphics engine 908 can continuously perform this operation or can perform it on demand (when selected by the user), periodically, or based on some trigger such as when a user selects a new source document or selects a "make" option in a GUI.

To further elaborate, there is a relationship between the annotations created from the conversion and the template. Graphics engine 908 adds the slide elements (or annotation sets) created in the conversion process to the slide or takes slide elements created in the conversion process and assigns or inserts them to be slide elements specified in the template.

In preferred embodiments, graphics engine 908 performs a process that detects conflicts. Graphics engine 908 can include procedures that, using the user-selected slide template, the one or more annotation sets or slide elements, a page size, and the user-selected document content, detects spatial conflicts. Graphics engine 908 is capable of analyzing spatial relationships, boundaries, and limits of a slide and its slide elements. Graphics engine 908 determines the initial spatial size of slide elements (or intended slide elements) and their position in a slide based on the slide template. A group of slide elements that are contained within a larger element can be evaluated by the graphics process using the spatial size of the larger element. The slide presentation can include an indicator associated with the slide element that specifies whether the slide element is one that can be scaled or should be maintained at a static size. Graphics engine 908 can also determine the page size for the slide from the template and use predetermined margin limits and a predetermined minimum spacing distance between elements or types of elements.

Graphics engine 908 processes this spatial information and detects spatial conflicts. Spatial conflicts can include detecting that slide elements overlap or interfere with each other (e.g., based on their current spatial size and location). Larger blocks that can contain slide elements can be used by the graphics process for the evaluation. For ease of convenience, in this context, unless the sentence or language indicates otherwise, "slide element" is also in reference to "intended slide element," a slide element that corresponds to one or more annotation sets and which will be created as a slide element when graphics engine 908 decides on the layout and properties of the current slide under processing. Individual slide elements can also be evaluated. Graphics engine 908 also detects spatial conflicts when one or more slide elements extend into the predetermined margin space of the page or extend outside the page. Graphics engine 908 also detects spatial conflicts when slide elements are too close to each by detecting whether slide elements are less than the predetermined minimum spacing distance between each other. Again, it should be understood that a larger element that contains slide elements can be a basis for determining a conflict arising from minimum spacing or margins.

In response to detecting a conflict or applying programmed spatial slide presentation rules, graphics engine 908 determines an arrangement of slide elements or with respect to an existing slide, moves, sizes (e.g., resizes by scaling), and formats the slide elements, user-selected document content, or both from a first state to a second state, and thereby generates a resultant slide containing the slide elements and user-selected document content, including the slide elements or user content in the second state, in accordance with the slide template. Once a spatial conflict is detected, graphics engine 908 applies one or more spatial reconfigurations that avoid the detected conflict. The spatial reconfiguration can include modifying one or more slide elements from their current state to a second state by moving, sizing, or formatting slide elements or user content (e.g., an image from another file). Graphics engine 908 can also detect multiple conflicts, which may be different types of conflicts, process the spatial information and identify moves, resizing, or reformatting or layout that avoids all or some of the conflicts without creating new conflicts. The graphics process performs this by processing the spatial data and determining the results of different combinations of modifications. From this, it identifies a final state to be used.

Graphics engine 908 can also include requirements for a minimum size for an element or different types of elements. Graphics engine 908 can also implement a process that maximizes the size of slide elements or particular types of slide elements. It can incorporate this as part of determining the results of different combinations of modifications. As such, graphics engine 908 dynamically detects and avoids conflicts and identifies a best spatial size or location for a slide element. The analysis includes evaluating the location, size, and spatial interrelationship of two or more elements (as many annotations or elements that are in the slide or proposed to be in the slide) and applying a preferred size range that maximizes two or more elements (or all involved elements) without creating conflicts.

Graphics engine 908 can also evaluate the shape of an element and determine whether the shape is within (not larger or smaller than) a predetermined shape size that is preferred or acceptable for that element (or that type of slide element).

The slide creation application and its components such as graphics engine 908 involve functionality that necessarily requires a computer to be able to implement the functionality. The number of iterations, variations, spatial information, interrelationships, precision, needed conversions, object insertions, and number of visual items creates a complex problem that requires a computer to implement the capability of graphics engine 908 and related features.

The slide creation application or some other application can provide the user with the opportunity to view the resultant slide in an art board and to edit the resultant slide. Graphics engine 908 can be applied to the resultant slide so as to generate a revised slide containing one or more size, position, or format modifications to the slide elements or user content.

Processing and generating module 910, in response to graphics engine 908, retrieves user content (e.g., an image excerpt or textual argument) and the adapted one or more corresponding slide elements, processes, on the computer, the content and adapted one or more corresponding slide elements, and from that processing, generates a resultant slide that is configured in accordance with the destination format. For example, an image from the source document or a portion of the source document is combined with the graphics of a slide element generated by graphics engine 908 and a resultant slide containing the image in the slide element is generated.

The application generates the slide based on template properties and other factors as described herein. As discussed, the template can be an intelligent or smart template that dynamically varies the resultant slide based on conditional or logical analysis. As such, slide creation application 902 can receive a smart template. The smart template can be a distinct electronic file that is stored in memory and retrieved for generating varying slides based on selected content or information in annotation sets. The smart template, for example; contains logic that is configured to evaluate inputs such as information in annotation sets or text in user content and in response; properties of a resulting slide or slide element are varied. It is possible for this functionality to be incorporated into the application (as opposed to being part of a template that is retrieved and used). However, a smart template provides greater flexibility in that the desired logic is integrated into the template along with other properties that are related to the desired objective that is sought to be accomplished by the logic or slides. Potentially, the smart template has other advantages such as portability to other applications. The smart template also provides greater flexibility in allowing a user to switch quickly between different slide templates that carry both dynamic slide generation capabilities (using the logic) and "fixed" slide properties or characteristics such as background color.

Logic carried by the smart template can accomplish many different automated functionality as part of creating slides. For example, it can vary background color, spatial characteristic (position, size, or orientation of a slide element), highlighting, scaling of fonts, other color properties, etc. Together with the static properties, a set of slides can be generated for a presentation that has consistency in many properties and is capable of presenting varying slides that maintain that consistency while communicating other concepts by way of the logic and its reliance on the information or images that are being presented. Graphics engine 908, processing and generating module 910, or a combination thereof can apply the dynamic functionality of the smart template to vary the resulting output slide.

In some embodiments, processing and generating module 910 can be a part of graphics engine 910.

It should also be understood that different combinations (removing or adding features) and temporal orders are contemplated. For example, in the above discussion, the application includes a process in which it automatically locates annotations in the a document but in other embodiments, a user can identify and create annotation sets and the application receives the annotation sets and operates moving forward from the point of having the annotation sets for generating a slide.

The system can include a process for dynamically generating a slide using an image of a page (or an image of a portion of a page), wherein the image is in an image format. This process can be implemented to be its own module or can be implemented as part of another module such as graphics engine 908 or annotation set module 904. As described, a starting point can be a user-annotated page in a source document. The process retrieves the page from within the source document. The user annotations and the page can be considered to be separate files or groups of data. The module converts the page from a source format to an image in an image format. In this context, the page is sometimes referred to as the selected page because it is the page a user has selected to annotate and incorporate into a slide. In one example of the process, a page of a PDF document is retrieved and converted to a high-resolution image in an image file format such TIFF or JPEG. The process stores the generated image in memory and as part of generating a resultant presentation slide, retrieves the (high resolution) image, processes the image by extracting a section of the image and inserts the section into a corresponding one of the slide elements. Application 902 as part of this can generate a scaled version of a section of an image and insert the scaled version into the corresponding one of the slide elements. Application 902 can perform this image retrieval every time an excerpt or the page is inserted into a presentation slide. This process can deliver a high-quality work product which is not available in conventional systems because of the use of scaled portions of the image that are lower quality which are used in existing systems.

Because of this process of generating and retraining a source image, the image can be accessed multiple times such as for use in different slides or when the slide element is resized. Printing a high-resolution image that has been cropped to display a specific area results in a lower-quality print (and therefore not preferred) than printing an uncropped image that has been created at approximately the size the image will be displayed on screen. The uncropped scaled image will also display with fewer flaws. Additionally, animating large cropped images (as opposed saving a high-resolution image of an uncropped page) often results in choppy playback. This means by processing an area of an image such as a tearout externally and then importing it at a prescribed resolution will yield the most desirable results for display, animation, and printing. The numerical offsets for the cropping can be stored as variables or PowerPoint labels on the image shape so that the image can be converted back into a "live" cropped image at will. Once "live," the image cropping can be revised to show or hide image information and then once again "rasterized" to work best in the program.

Figure 10:
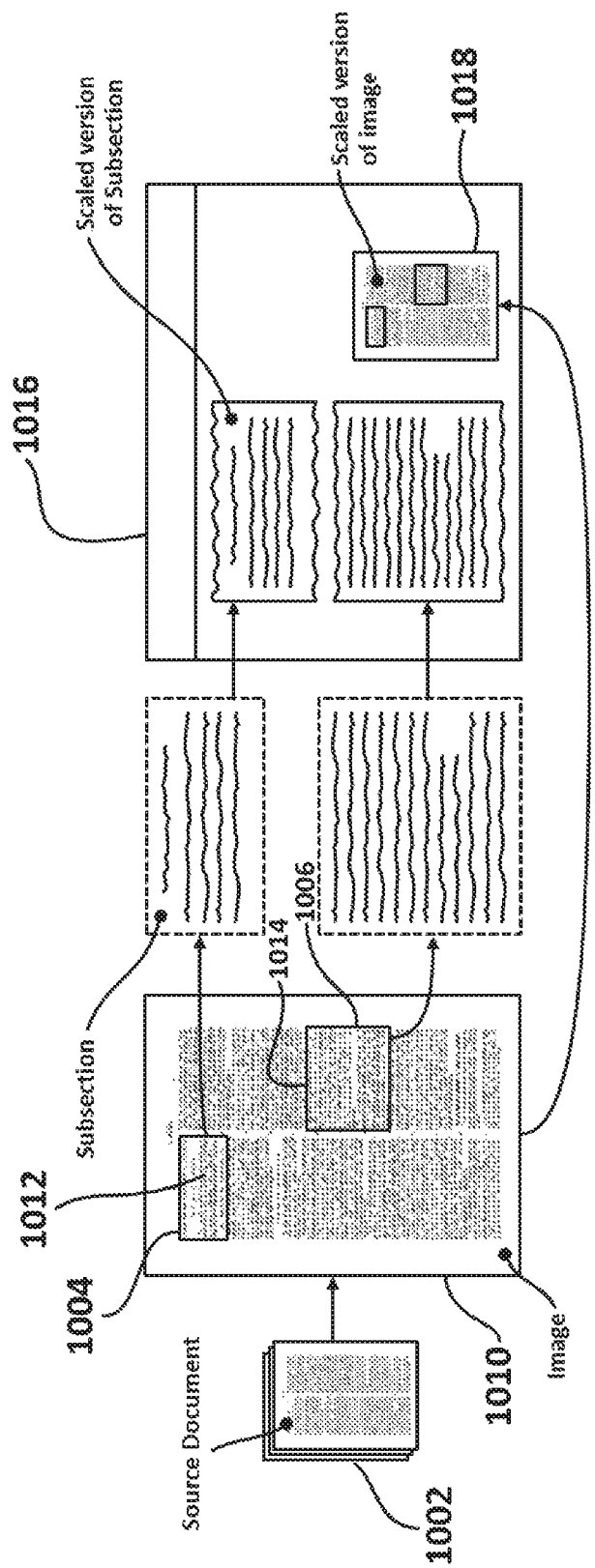
FIG. 10 illustrates an illustrative process in accordance with one or more embodiments of the present invention.

For example, with reference to FIG. 10, source document 1002 is a PDF document that is stored in memory on the computer. A selected page, page 1010 in source document 1002, includes two user-added annotations 1004, 1006. The annotations are graphical boxes that the user drew in certain locations in the selected page using Adobe Acrobat and that information is saved as part of the PDF file. The slide creation application retrieves page 1010 from within document 1002 and converts page 1002 to an image, and further stores the image in memory for later retrieval as part of the slide creation process. Annotations 1004, 1006 define sections 1012 and 1014 of page 1010. When the application generates slide 1016, the application retrieves the image version of page 1010 and extracts a portion (in this case, two portions) of the image for placement in the slide element for that extract. As part of the process, the application scales the image excerpts for the sections (typically from a larger detailed image to a smaller size). Similarly, the image is scaled to generate page icon 1018. As described above, the application reads the annotations in the PDF file and from that information identifies user annotations and translates user annotations into slide elements for use in the slide creation application.

As discussed, the application also performs a transformation in two-dimensional space between the spatial location and shape of annotations in the source document to the location and shape of corresponding graphics in relation to the image. The image can have different dimensional characteristics as result of the conversion and its inherent file format (or because of the file format used by the slide creation or presentation application). The application performs a relational conversion between the two formats that results in specifying the location of the desired graphic over the "new" image. This process can, for example, involve a conversion of coordinate systems, using a measuring module that calculates offsets from edges, or using expected reference markers or text on the page to synchronize locations between the source page and the working image used for generating the slide.

As shown, the application creates slide 1016 containing tearout slide elements and page icon 1018 in a vertical side-by-side arrangement. In some embodiments, if desired, the application will only save a high-resolution image of the excerpt or save a high-resolution version of the full page and the excerpt.

If desired, the process is implemented in different modules that together provide the described functionality such as by being implemented in annotation set module 904 and graphics engine 908. Also, an annotation set can be defined by a data structure that includes as part of the structure the high-resolution image or a link to the high-resolution image. If desired, there can be multiple versions of the image at different resolutions that are saved for different purposes. Those can also be part of the annotation set and used in generating slides.

As discussed, in some embodiments, portions of the slide creation application can be implemented on two or more computers and in particular, a first portion can be implemented locally on a user's PC and another can be implemented on a server such as a website application server on the Internet. This can provide certain advantages. Other embodiments can involve implementing the system as a web application in which the slide creation application is running on an Internet server and the application is accessed through an Internet browser of a client PC or mobile device. In a web application model, there is no need to install a resident application on the user's device; the features and functionality are provided through interaction in the browser with the slide creation application. Another embodiment is one in which an add-in module (e.g., added to PowerPoint or Acrobat or both) is configured to communicate with a server over the Internet or other network arrangement such as a server that implements a graphics engine portion of the application.

Figure 11:
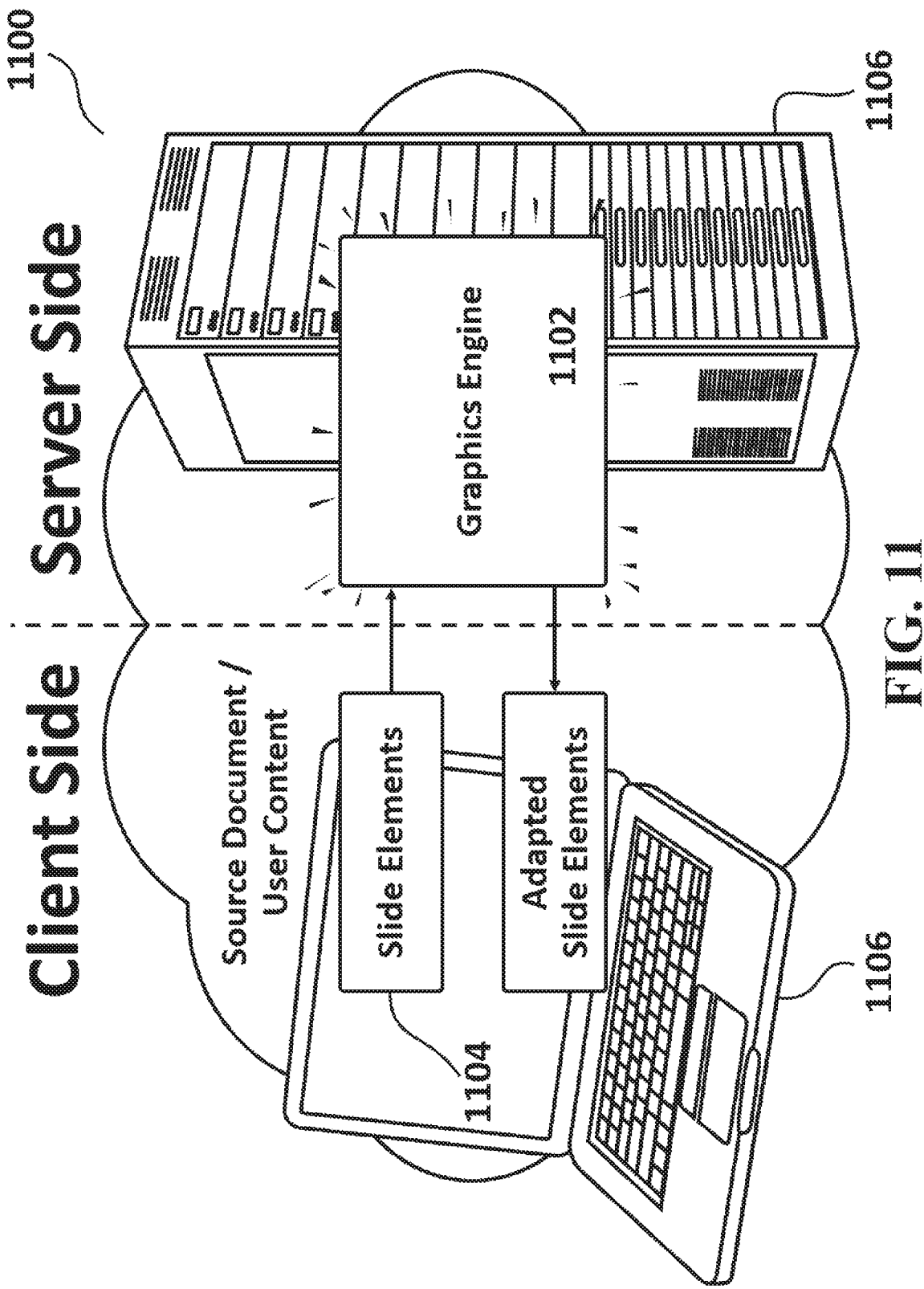
FIG. 11 is a diagrammatic representation of a system in accordance with one or more embodiments of the present invention.

For example, with reference to FIG. 11, system 1100 can implement an embodiment of the slide creation application. In this configuration, graphics engine 1102 is implemented on a server on a wide area network such as the Internet. The slide creation application is implemented to cooperatively operate on client device 1106 and server 1108. The application is implemented on the devices and the network with a restriction that the application running on the client device protects user content such as images or written text from being transmitted over the network to the server and it also prevents from client device from having access to the mechanisms and process by which the graphics engine accomplishes its tasks. In this embodiment, annotations are identified and converted into corresponding slide elements 1104 that match the graphical characteristics communicated in the annotations. The application transmits slide elements 1104 or information that describes the slide elements 1104 such as annotation sets to graphics engine 1102. Other information such as a selected layout, page size, and font information can be transmitted from client device 1106 in connection with transmitting slide elements 1104. Graphics engine 1102 receives the transmitted information and automatically creates, adapts, or adjusts slide elements 1104 by defining, resizing, reshaping, moving, repositioning, or rotating to be in a layout configuration that matches the template, maintains the slide elements within the display container page, and optimizes for presentation (e.g., applies a set of intelligent rules that automatically avoids spatial conflicts of the undesired configuration of a slide). Graphics engine 1102 performs this automatic reconfiguration, e.g., relocating different slide elements because of conflicts (such as overlapping windows or text) when it receives slide elements or when a "make" request is received. If desired, graphics engine 1102 may be configured to continuously receive changes to slide elements (in a current active page in a GUI being used a user on a client device) and may continuously and automatically apply the process to generate adapted slide elements (e.g., ones that avoid overlapping and optimize the presentation of information). For example, a user can be provided with the opportunity to manually move, size, or perform other modifications to a slide element in an art board and the slide creation application can be configured to automatically apply the process to the slide when a modification is manually made by a user in the art board.

Graphics engine 1102 transmits the new graphic characteristics for slide elements generated from the processing back to client device 1106. Client device 1106 receives the new information and stores the updated slide elements for the current slide. The application can then retrieve local image excerpts or use provided text, and integrates that content with the new slide element to generate a resultant slide. Other content such as graphical elements or digital artwork can also be locally saved and integrated into the slide at this point if desired. The slide can be stored in the native format of a conventional slide creation application.

In a related embodiment, the slide creation application implemented on client device 106 is an add-in module that is installed in a conventional slide creation application that the user may have already installed. When selected, the add-in module communicates and operates in the same way with graphics engine 1102 on server 1108.

In this embodiment of the presentation slide creation system, the graphics engine is implemented on a server that receives defined slide elements over a network and transmits the adapted one or more corresponding slide elements to the computer of a user. In doing so, the system separates the slide creation application into two portions, with one portion being remotely on the server.

One aspect of embodiments of the invention relates to the graphics and functionality capabilities that can be implemented in slide creation systems and the slide creation application. The slide creation application (e.g., the conversion process of the slide creation application) can be configured to have operational knowledge of the features and functionality of a third-party slide creation application such as a conventional slide presentation application (e.g., PowerPoint). This information can be stored in memory such as a database, a set of rules, and/or interface commands or connections that can direct the conventional slide creation application or third-party slide creation application. The slide creation application of the present invention can be an external application that is capable of interfacing with the third-party slide creation application (e.g., PowerPoint) with knowledge of the resident capabilities of the third-party slide creation application. The slide creation application is capable of adapting the output of its graphics processing to be compatible with the third-party slide creation application. The slide creation application can generate codes, commands, or formatting that define a slide (in conformance with the third-party slide creation application in that the third-party slide creation application can simply open and play a slide created by the slide creation application in accordance with embodiments of the present invention). The slide can also be further edited within the third-party slide creation application.

The slide creation application can combine or use tools and functionality that are executed in the third-party slide creation application and the new combination or use can result in a new tool or function available to the user in slide creation application as a resident feature. The resident feature would be executed by controlling a combination of features or functionality available in the third-party slide creation application. The new tool or function can be an entirely new tool for creating slide elements or can be an improvement in operation to existing tools that are resident in the third-party slide creation application. Embodiments of the present invention can use the executable operational capability of the third-party slide creation application to generate slides that are not possible from within the third-party slide creation application.

If desired, the slide creation process that creates a slide in the file format of a third-party slide creation application can insert codes into the slide that are recognizable or used by the slide creation application, but not recognizable or used by the third-party slide presentation application. As such, as an added layer of protection for the software developer, embodiments of the present invention can be configured to insert codes or commands to the slide or slide elements that are compatible with the functionality available in the slide creation application, but which are not compatible with the third-party slide creation application. These codes can be encrypted and can be inserted into a file for a slide or slide element as added text in the file that does not interfere or prevent the slide or slide element from being compatible with the native format of the third-party slide creation application. The "added" code, which can be proprietary, can be used in embodiments of the system of the present invention such as its slide creation application when operated by a user, in order to, for example, validate, authorize, or present user-interactive options or slide features (such as the new tools or functions that are only available within embodiments of the present invention).

The slide creation application of the present invention can be a standalone application, but in some embodiments, described herein, it is an add-on, plug-in, supplement, or enhanced addition to an external slide creation application, which may be a conventional slide creation application.

Again, with reference to FIG. 11, the presentation slide creation system transmits information from client device 1106 to server 1108 for generating the resultant slide to the server without including user content, the selected page, the source document, or an image of the selected page or a portion thereof. The slide creation application can maintain a separation between such user content and slide element and can send slide elements or their characteristics to the server for processing. It can do so even though the slide elements are dependent on the user content (e.g., the size and shape of the user content image affects the graphic characteristics of the slide element). When the adapted slide elements are transmitted back to client device 1106, the slide creation application merges the user content with the slide elements and in so doing generates the resultant slide. In operation, the slide creation application transmits graphical-state related information to server 1108 and prevents user content on client device 1106 (or accessible to client device 1106) from being transmitted to the server and also prevents the client device from having access to the mechanisms and process by which the graphics engine accomplishes its tasks. In this security enhanced implementation, each client can use the application at a client computer to view and interact with their own confidential documents. The system is configured to provide each customer with that functionality and the system further provides each customer with the ability to rely on the graphics process and/or programmable spatial slide rules (at least a portion) that is implemented at the server (or all or substantially all of which is implemented at the server). The system interacts with each client similarly by implementing the graphics level process at the server (to create slide elements and resultant slides) without the server having access to the client or customer confidential information.

Another aspect of the presentation relates to providing a better tool for developing, tracking, and presenting an organized presentation involving the integration of many different sources. This can be particularly helpful in a context involving many source documents such as in litigation in connection with preparation for a trial or hearing. For convenience, these embodiments are described using a litigation implementation, but it should be understood that other implementations are also contemplated (e.g., professors, students or people in various commercial or non-profit organizations who are developing presentations covering the results in a number of published articles and papers).

As discussed above, embodiments of the present invention relate to providing an interactive feature that permits the management and organization of documents as part of a larger project. For example, in the field of litigation, there are existing systems that allow for coding of documents. However, the codes attorneys use to locate documents or pages in order to find evidence using existing systems are frequently no longer used by the attorneys once the evidence has been located. For example, finding all documents from a specific person on or around a specific date might help one find a relevant letter from a large group of pages, but it does not identify the document as pertaining to a specific argument or idea. Also by way of example, document productions are reviewed and often times coded with labels or keywords as part of a document process or in preparation for a deposition, but often times these documents are not necessarily the documents that will be used as evidence at trial. In addition, these codes are often times preliminary and rough. In embodiments of the present invention, once the evidence is located and annotated, you can code it as relevant to a specific case position or argument (e.g., "infringement"). These new tags can be available to the user through a mind map-type graphical user interface. In this interface, the user can easily assign a tag or node to an annotation or group of annotations. A user is able to add, delete, move, open, and collapse nodes. By arranging the nodes in a hierarchical layout, the user can retrieve a larger set of annotated pages by searching for evidence pertaining to a node at a lower level. These hierarchical codes are herein sometimes referred to as "tree tags." Using the tree tags, the user can retrieve all evidence (with the relevant sections and annotations) that has been found to support a specific argument.

Figure 12:
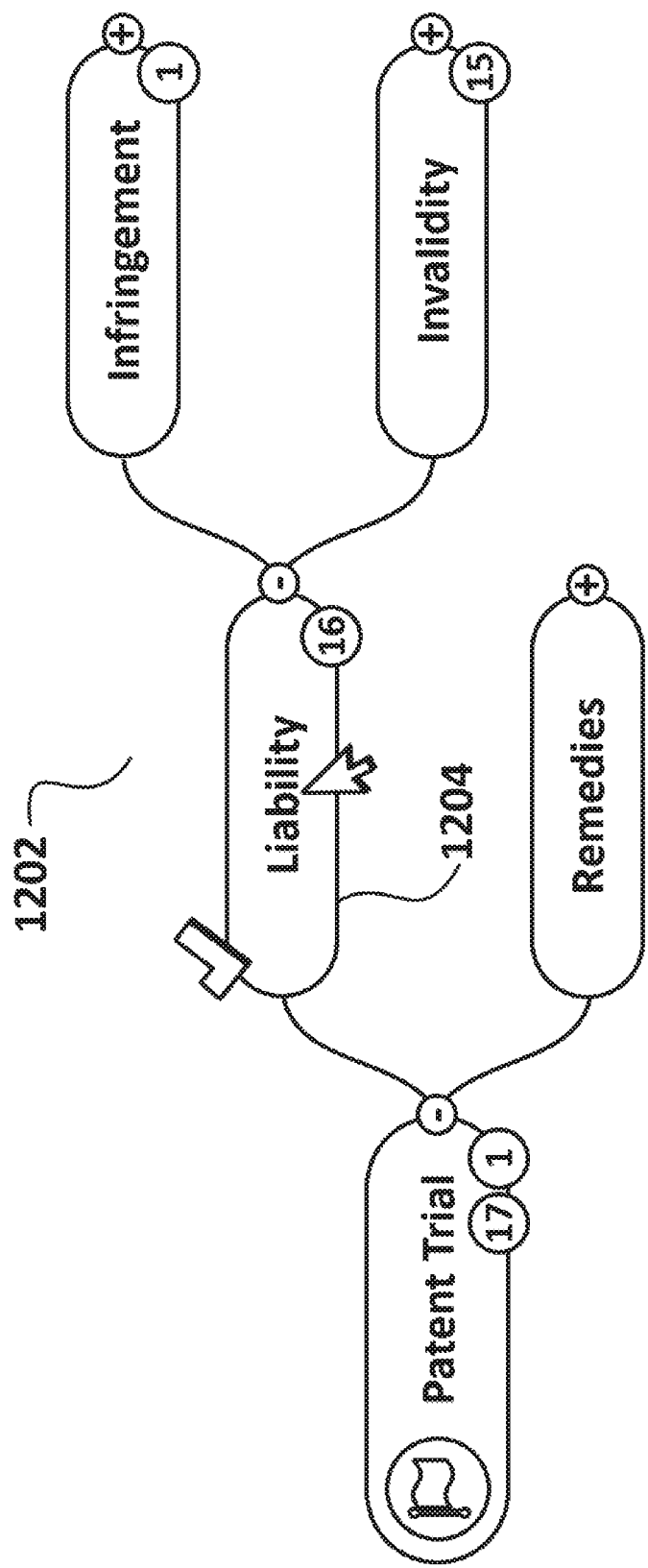
FIG. 12 illustrates a hierarchical tree in accordance with one or more embodiments of the present invention.
Figure 13:
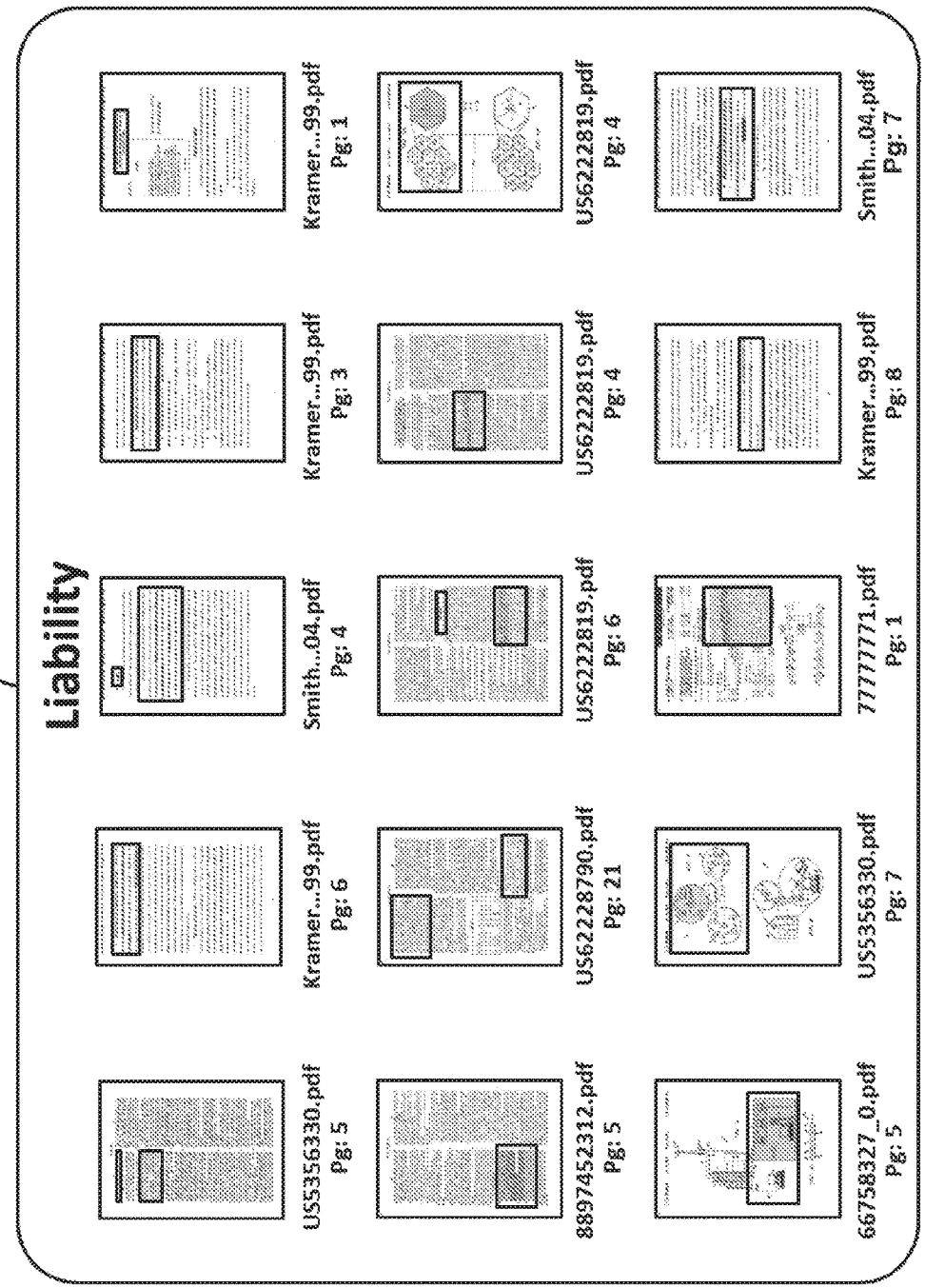
FIG. 13 is a diagrammatic representation of a display screen in accordance with one or more embodiments of the present invention.

For example, the presentation slide creation system can include an interactive option as part of the slide creation system that selectively tags a section of an image of the selected page with a hierarchical tag and stores selected tags in association with the corresponding section. With reference to FIG. 12, the slide creation system can include a management system that stores, tracks, and displays documents and document pages. The system can display in a user interface a tree-type structure such as tree 1202. Each bubble in tree 1202 includes a tag or category that communicates an organizational label. A smaller bubble is displayed within each bubble that communicates the number of document pages or individual excerpts that have been selected and tagged under that identified bubble tag. The presentation slide creation system, as part of this display feature, generates a display illustrating a view of the hierarchical tags and includes an interaction option to select one of the tags and in response, corresponding sections with that tag are displayed together. For example, when liability bubble 1204 is selected, the application, in response, generates a new display such as display 1300 of FIG. 13. Display screen 1300 generated by the slide creation application is a convenient and helpful tool that displays page icons of document pages that contain an excerpt that is tagged with that label (e.g., in this case, liability). In this way, a user can quickly see all of the selected evidence (thus far) that is under that tag and can also see the information down to the section that is selected on a page as evidence for that tag. The slide creation application and the display interface for display 1300 can provide the option to select any of the page icons and in response, the application displays an enlarged view of that document page and also the graphical element that highlights the specific section of the page that is assigned that tag. The page can be displayed by retrieving the image that was created of that page and scaled depending on the size of the user interface. The application can have its own folder or non-volatile memory area that stores these images for retrieval. If desired, the slide creation application can have a communications or application interface with document production and review applications or other litigation support applications (e.g., for accessing and reviewing depositions) and with that interface, the application can retrieve pages or documents.

Figure 14:
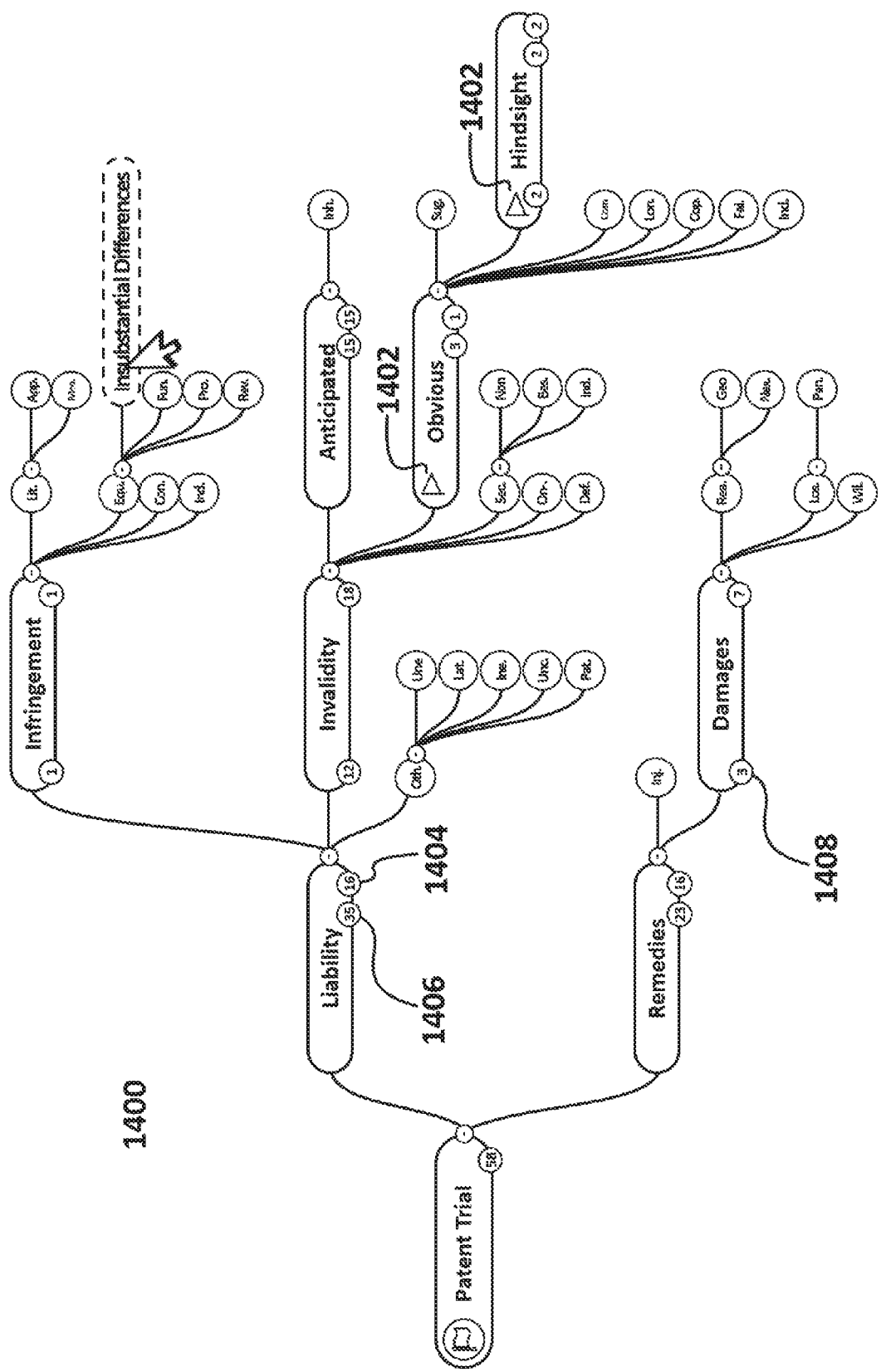
FIG. 14 illustrates a nodal map in accordance with one or more embodiments of the present invention.

This approach provides the ability to quickly find strengths and weaknesses by visually inspecting which elements in a tree have associated tagged documents and also how many documents are assigned to each tag (because of the numeral indicator illustrated with the bubble tag). For example, with reference now to FIG. 14, if the annotation sets are stored using tree tags organized by legal argument, the user can see a case overview 1400. At a glimpse, the user can tell which arguments appear to be relevant to each party in the case and if evidence is lacking for important arguments. Nodes (or bubbles) can be connected to external data. For example, nodes can be made for specific legal cases that apply and can be connected via Keycites to Westlaw for updates. Flag icon 1402 will change color to indicate a new development. A number in the bottom right of each node (e.g., 1404) identifies how many annotation sets have been associated with the node in a manner that is positive (e.g., evidence supporting the user's positions). A number just to the left (e.g., 1406) is a cumulative sum of the annotation sets associated with the current node and all nodes downstream or subarguments of the current argument. A number on the left (e.g., 1408) identifies how many annotation sets have been associated with the node in a negative manner (this could be harmful evidence or evidence relied upon by the other side). The system may analyze nodes and display nodes more prominently when they are flagged as relevant or containing data. Summaries of this information can be searched and printed.

As a matter of clarification, FIG. 12 illustrates a binary tree, but it would be understood that a non-binary tree is also contemplated. If desired, the system can also process complex tag relationship structures, not limited to a hierarchical tree.

Figure 15:
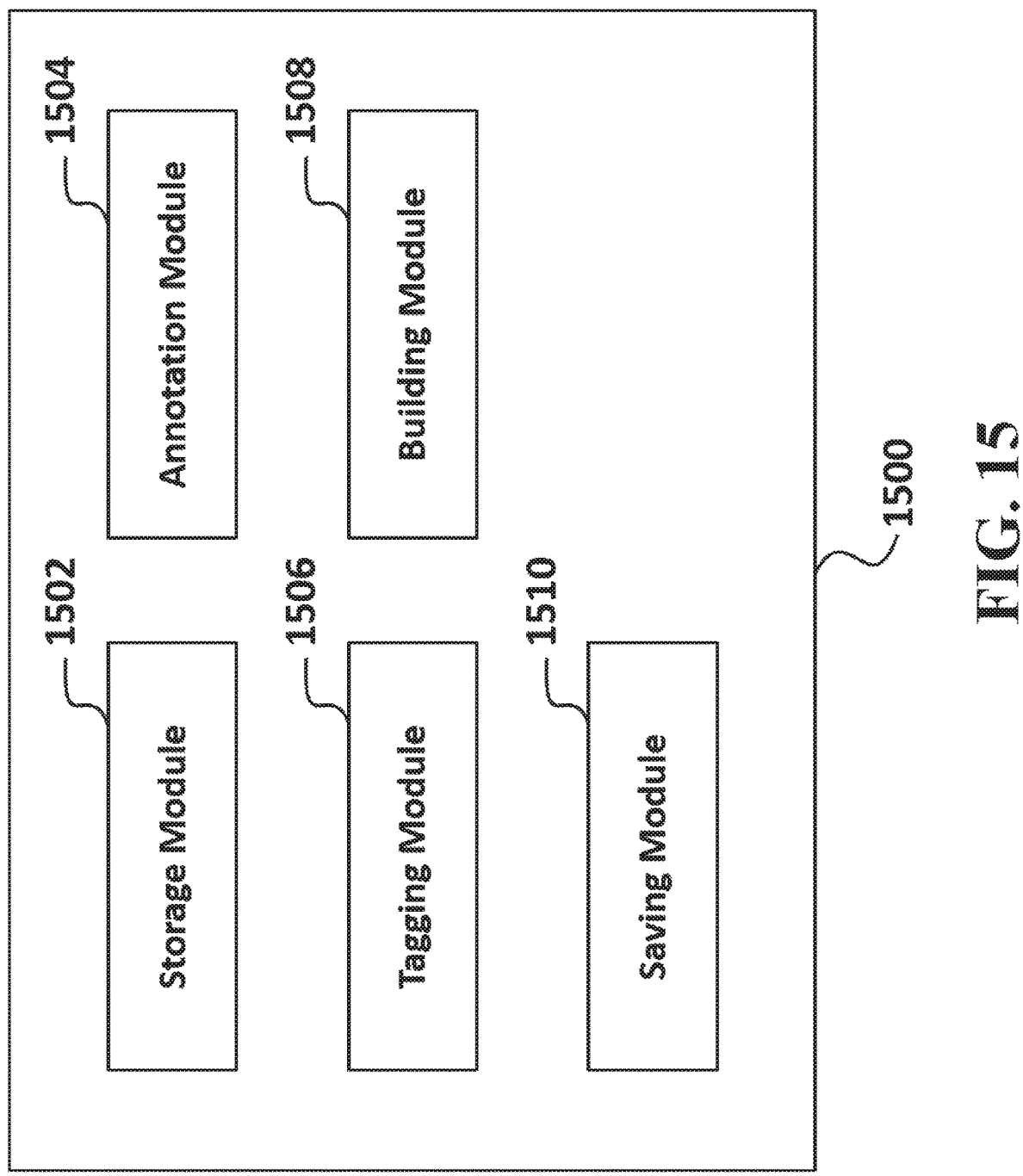
FIG. 15 is a block diagram of a system in accordance with one or more embodiments of the present invention.

With reference now to FIG. 15, a computer-implemented system 1500 can be provided that provides slide creation features (e.g., those described herein). System 1500 can comprise one or more computers that implement a software application that configures the computer(s) to provide the programmed features. The software application can be implemented using a number of software modules that are in cooperative signal communication with each other and together provide the functionality of the application. System 1500 includes modules that implement or relate to features described above. System 1500 can include storage module 1502, annotation module 1504, tagging module 1506, building modules 1508, and saving module 1510. Storage module 1502 retrieves source documents to be used for slide presentations. Annotation module 1504 retrieves, from a first application (e.g., Acrobat), annotations made to a current active page (in the first application) that identify or contain a user-selected geometric shape overlaying a specific portion of the current active page and wherein annotation module 1504 creates an annotation set from the annotations. If desired, annotation module 1504 may obtain or create an annotation set in a different way such as other ways described herein. Tagging module 1506, in response to user instructions or interaction, specifies tags and associations, and creates a tree tag that tags individual annotation sets with user-specific tags representing a first or second subject category for slide presentation pages. The tree tag has a structure comprising a searchable hierarchical code. Each tree tag is of a type that has individual logical links to individual ones of the specific portions in a plurality of corresponding pages from different source documents.

Building module 1508 can add an annotation set group to a slide in the appropriate order of insertion. Then, it generates a presentation slide in a format used by a conventional slide creation and presentation application (e.g., PowerPoint) with these insertions.

Building module 1508 extracts and scales image portions of an individual corresponding page that underlies the user-selected geometric shape. The image excerpt can be a section that is needed for one of the slide elements corresponding to a user annotation. Saving module 1510 saves the file, the page group, and annotation set in memory for retrieval and reuse. The result can be a set of source content (images and image excerpts) and codes (codes and data compatible with the separate application) that together form a slide presentation page. System 1500 comprises hardware for such a computer (e.g., personal computer, mobile device, client/server computers, etc.). It should be understood that, in some embodiments, system 1500 will include display capabilities and other capabilities such as network functionalities. It would also be understood that software instructions can be implemented to provide the slide creation application on the computer and also that software instructions for the application and related files for the application can be stored in non-volatile memory.

Figure 16:
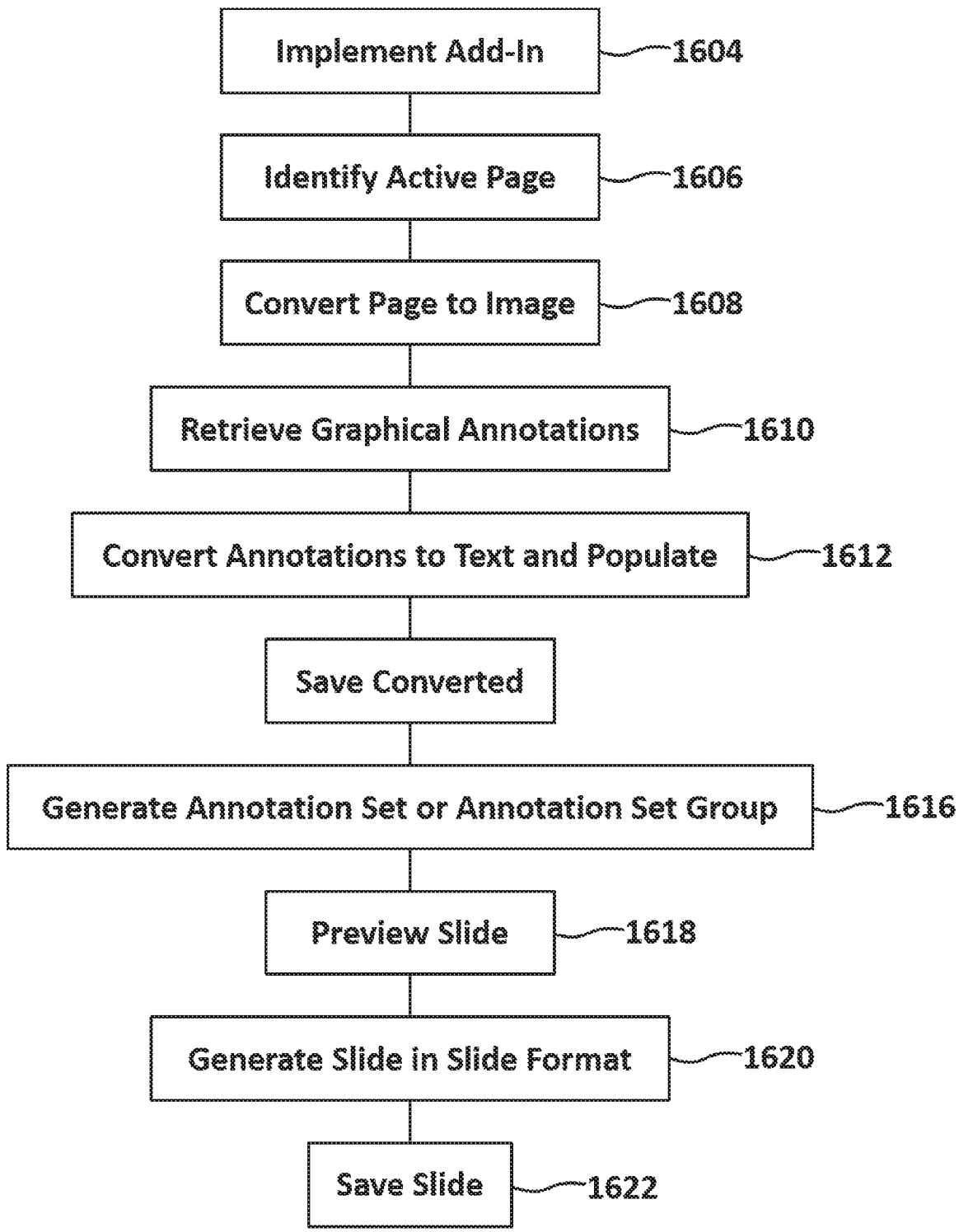
FIG. 16 illustrates a flowchart that may be followed in accordance with one or more embodiments of the present invention.

An illustrative method that embodies some embodiments of the present invention is shown in FIG. 16. FIG. 16 illustrates a method comprising an improved process for generating presentation slides such as electronic trial demonstratives. At step 1604, the method implements, as part of a third-party presentation application, an interactive option as an add-in or plug-in within a PDF viewer application. At step 1606, in response to the selection of the option, the method identifies the current active page within the PDF viewer application using file-state information from the PDF viewer application. At step 1608, the method converts the current active page to an image file of the page in an image file type for that single page. At step 1610, in connection with the converting, the method retrieves graphical illustrations, which were added as a graphical overlay using GUI tools by the user over user-selected portions of the current active page of the PDF document, wherein the graphical illustrations such as a graphical box are retrieved in text format (that represent or describe the graphical box) from the PDF document through the PDF viewer application. At step 1612, the method converts the retrieved text-format graphical illustration into a converted text format and populates XML fields with the converted text.

At step 1614, the method saves the converted text in an XML file. At step 1616, the method generates an annotation set or an annotation set group comprising the image file and the XML file and further including an identifier link that connects the image file and the related XML file. At step 1618, the method provides the user with a preview interface in the demonstrative presentation application that previews a demonstrative presentation slide using the annotation set or annotation set group and a designated presentation layout arrangement. The interface comprises a functional draft preview of the corresponding presentation slide includes live options for interactively modifying the properties of the previewed demonstrative presentation slide. As part of generating the preview, the application applies processes to the annotation set or annotation set group for creating a presentation slide that, as discussed above, avoids spatial conflicts or apply programmed rules, and in response, produces and displays a preview of the corresponding slide. At step 1620, the method processes the annotation set or annotation set group to generate the demonstrative presentation slide, wherein the processing results in generating from the different parts of the annotation set or annotation set group an individual file in the software resident format for files in the presentation application, the processing comprising retrieving the image, inserting the converted text, retrieving portions of the image that are related to the graphic overlay layers, and generating increased or decreased scaled version of the retrieved portions. At step 1622, the method saves the generated individual file for use within the presentation application.

If desired, a slide creation application can include an interactive option as part of a user interface for defining annotation set groups. Once the specific annotation set or group of annotation sets that make up a tearout or slide element are found, they can be selected or identified using the user interface of the application for use in producing slides and slide elements. One way to do this is by using groups. An annotation set group identifies the source annotation sets to be used in making a tearout or slide element— and also shares a common set of controls and properties. These define how the components of the tearout or slide element look and behave including the visual style, layout, and design. By having multiple annotation set groups, you can combine multiple tearouts on a single slide.

Figure 17:
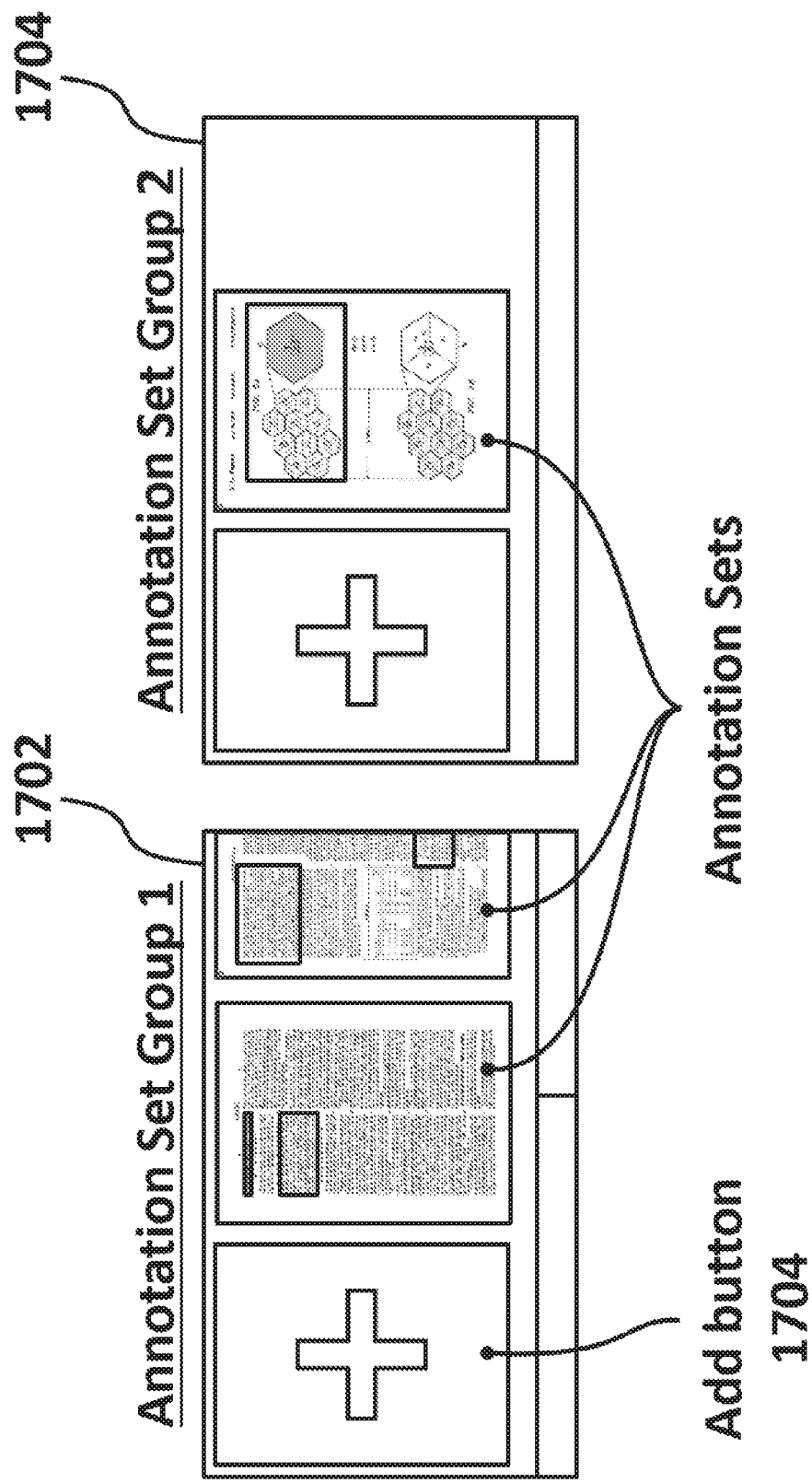
FIG. 17 is a diagrammatic representation of a graphical user interface in accordance with one or more embodiments of the present invention.

Further by way of example, FIG. 17 illustrates a portion of a graphical user interface for adding and selecting annotation sets to define a particular annotation set group. Window 1702 can include add option 1704 for adding annotation sets. By selecting add option 1704, the user is provided with the ability to select an annotation set or a page (that may already contain annotations) to add or include the annotation set group. An annotation set can be a set of annotations added to a particular page. An annotation set can, for example, be annotation sets shown in window 1702 (graphical boxes). A second window 1704 can be included next to first window 1702 for combining two annotation set groups into a single slide.

The term "scaler area" is sometimes used herein to mean an area (designated area) that can be used by the system to position and scale slide elements to fit into the area. A scaler area can have a preset size and position or can be created automatically by the slide creation application. A preset scaler area can be initially user-defined by allowing the user to draw or position a resizable rectangle while working in an art board. This specifies to the slide creation application that the associated tearout or other slide element containing user content (e.g., an image) should be positioned in a certain area as large as it can fit. This may also be referred to as a manual scaler area.

There can also be what is referred to as "auto-scaler areas." Auto-scaler areas are created automatically by the slide creation system to scale and position the content in several positions. These different positions can effect temporary positions on the slide to aid in animation or aid the system in determining an optimal size and position. For example, if the system is configured to position an icon in a specific area and is configured to not overwrite the icon with other design elements, then the system generates a set of scaler areas on each side of the icon to determine which would provide optimal scaling and positioning for the design element. The system might then choose to use the optimal area. To further elaborate on auto-scaler areas, auto-scaler areas can be specified as a set (e.g., four areas on a slide or slide template) and the designation of the auto-scaler areas establishes for the system that the application can automatically select which annotation sets (or slide elements) should be inserted in which areas and scaled to a maximum or best fit. For example, it can select and fit one annotation set (or slide element), or group of user content into one of the four auto-scaler areas (best rules such as the geometric fit), The application can manage the best arrangement and scaling based on the properties of the auto-scaler areas and the annotation sets (and corresponding graphical representations) or other graphical input. To further clarify, an auto-scaler area implements a feature in which the system automatically creates scaler areas that correspond to available areas in a slide. For example, for a particular slide, a set of four scaler areas are generated. The four scaler areas that are produced are two "horizontal" scaler areas, one top and one bottom, based on available space and two "vertical" scaler areas, one on the left side and one on the right side. See for example FIG. 18B (which for clarity shows the four scaler area in two slides). Corresponding user content and dimensions of the scaler areas are compared and analyzed (e.g., using the programmable spatial slide rules) and one of the scaler areas is selected for adding the corresponding user content. Subsequent processing with respect to scaler areas would follow. Two "lateral" and two "horizontal" scaler areas are shown for illustrative purposes but other arrangements are contemplated.

FIG. 18B is illustrative for showing intelligent functionality and a particular aspect of the slide creation application by demonstrating features that are evident in the application from a discussion of resultant presentation slide pages. The slide creation application includes methods that improve the generation of slides automatically and intelligently. This includes situations in which a template specifying a base arrangement for the slide is selected and an annotation set or annotation set group are incorporated into it by the slide creation application. This can also include the incorporation of dynamic or static artwork. The slide creation application can have a mode in which it automatically implements scaling of one or more image excerpts or other scaling elements in a slide page/slide page container. The slide creation application evaluates and determines the graphical layout characteristics of image excerpts (or, in general, non-static slide elements) and applies processing that determines the level of scaling that should be applied to the slide element.

In determining the scaling, the application applies procedures that incorporate various factors, including an arrangement of the selected template, minimum or maximum distance between elements or different types of elements, the size and shape of the slide, minimum margins, and other factors. The slide creation application can include complex methods that vary the processing based, for example, on the situation or elements that are the subject of the processing.

This processing embeds and automates intelligence that is otherwise unavailable and not possible manually. Conventional third-party slide creation applications operate on a manual iterative system that leaves the creative process to the user of an individual slide. Complex slides involving multiple physical elements cannot be generated in such applications because the incorporation of an element or resealing of an element affects multiple other elements, including the proportionality. As discussed, the application incorporates a process that automatically identifies shape, size, and location and automatically moves, resizes, and/or reshapes elements that, for example, avoids overlap or conflicts between the layout of slide elements or boundary areas (such as margins or avoidance areas). The slide creation application implements this automatically and can do so continuously in response to received information. For example, the application can relocate or scale an element to be smaller when a conflict such as an overlap with another element is detected. The application or system can perform this operation when the user selects to submit a set of information (annotation set, template, and slide page container) and can also apply this process when a user selects a "make" option. The slide creation application can also be configured to monitor the GUI for an art board and automatically applies the adaption when a change in the presentation slide is detected in response to a user action via the GUI. If desired, this feature is implemented in the graphics engine. Also if desired, the feature can be implemented as a plug-in or add-in for a conventional or third-party slide presentation application, which embeds the feature in the conventional or third-party slide creation application as a tool within that application (such as by way of a button or other interface within the application and plug-in feature running locally or on a web server or a local area network).

Figure 18A:
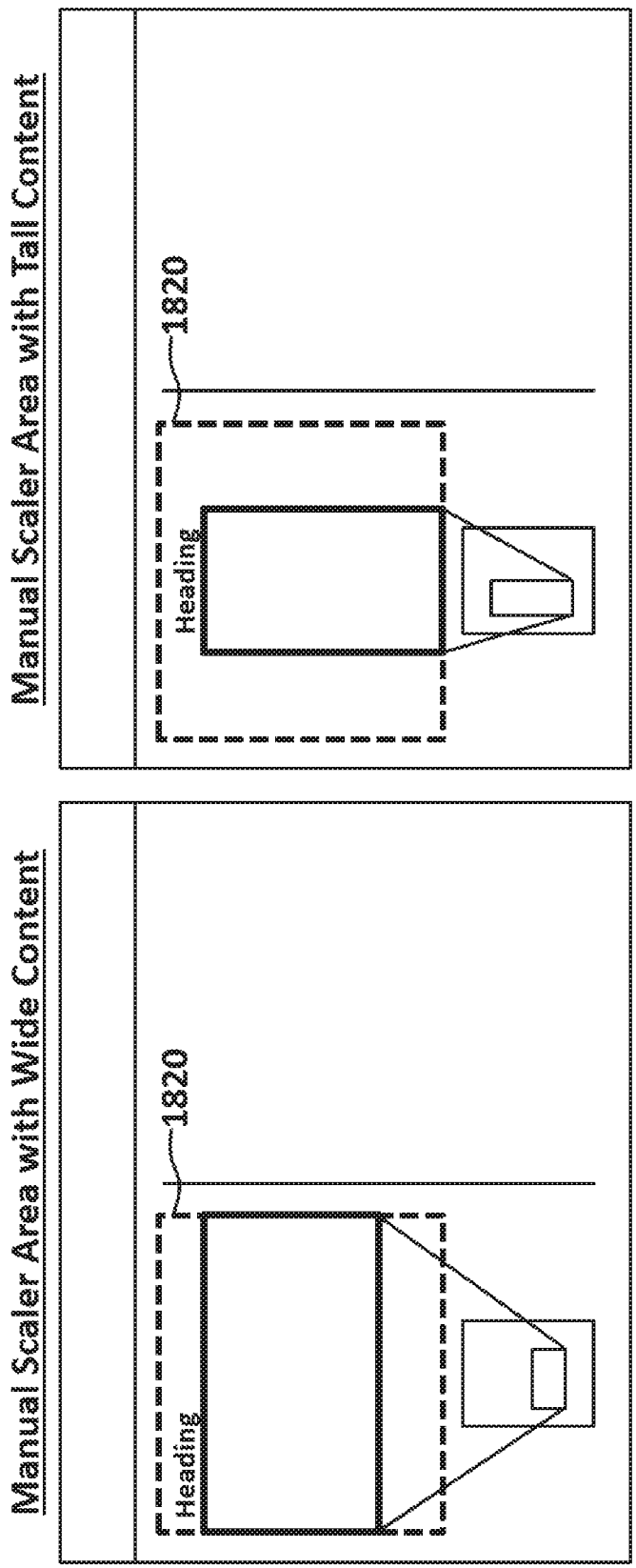
FIG. 18A illustrates a scaler feature in accordance with one or more embodiments of the present invention.

For example, with respect to scaler areas, with reference now to FIG. 18A, in each slide scaler area 1820 may have been manually or automatically selected and the slide creation application compares the scaler area to the shape of the image excerpt and automatically scales the excerpt to fit in the scaler area (e.g., using 1:1 proportion) and limits the scaling to not exceed the scaler area. In preferred embodiments, the application performs the automatic scaling to fit in the scaler area by maintaining the existing proportionality of the page. In these embodiments, the application would not perform stretching or adjustments to the proportionality beyond potential minor level of stretching or adjustment that would not provide the perception that the content was stretched or skewed.

The graphics process that produces the slide elements for a new slide and specifies the arrangement of elements on the new slide is preferably performed in "real time." Meaning the graphics process can quickly (in successive, simultaneous, or substantially simultaneous fashion) produce the slide elements and the new slide. There would typically be no need for iteration in that the graphics engine and/or programmable spatial slide rules can be applied to produce new slides and slide elements that are "perfect" or optimal at the onset (for example without requiring iteration or tweaks because of their quality.

For example, with reference to FIG. 18B, presentation slides 1800 and 1802 demonstrate scaling and avoidance features. Slide 1800 may have been implemented by applying a template that contains a vertical arrangement showing side-by-side image excerpts. Slide 1800 includes page icon 1804, which may be an image of a source document from which the image excerpts are extracted. The application receives and processes the source input and determines and identifies avoidance area 1806. Avoidance area 1806 may be a preset number or variable number based on dimensions. The application determines avoidance area 1806 by establishing a location and scaling for slide elements for page icon 1804 and the left and right areas for the image excerpts (or left and right scaler areas that are automatically or manually selected). A set of programmable spatial slide rules can implement this feature, the avoidance area and similar features.

The slide creation application also determines avoidance areas by applying an inter-element spacing that optimizes the arrangement of slide elements such as in an aesthetic way (e.g., implements a minimum or desired gap between objects such that, for example, they do not appear crowded or touching). As part of the process, the application determines a general location for the image excerpts and then determines the appropriate scaling that should be applied to the underlying image and image excerpt and then displays the image excerpts with proportional scaling in those areas. The application determines the maximum available scaling that can be applied that matches the available space assigned to that excerpt. In some embodiments, page icon 1804 can be a slide element that is configured to not be scalable and has a static size assigned by the application. This way, the application must process and manage static and dynamic visual elements.

Slide 1802 demonstrates that the application applies the process to a template that implemented a horizontal side-by-side view of image excerpts. Similarly, the application processes the input (e.g., an annotation set having a graphical footprint of an image excerpt) and implements avoidance area 1808 within slide 1802. In the above examples, embodiments are described in which there is a type of auto-scaler area that is configured to have a horizontal or vertical orientation. In other embodiments, the application implements the auto-scaler area feature by evaluating both the horizontal and vertical orientations in 1800 and 1802 with respect to which arrangement is the best layout for the two user annotations or other items that will be inserted into a slide. To further clarify, an auto-scaler area feature performs operations that determine the appropriate orientation or layout (from among variations such as horizontal versus vertical) based on the annotation set or other graphical content to be inserted into the slide area (to determine the best or preferred orientation or layout), determines which annotation set (or graphic) should be inserted into which area, and determines the appropriate scaling for the graphic items selected to be inserted into each area. These features can be performed by evaluating size and shape information between the available areas and the graphic items and also based on predetermined rules such as rules specifying certain items as being primary or of a type that is to be emphasized.

Figure 19:
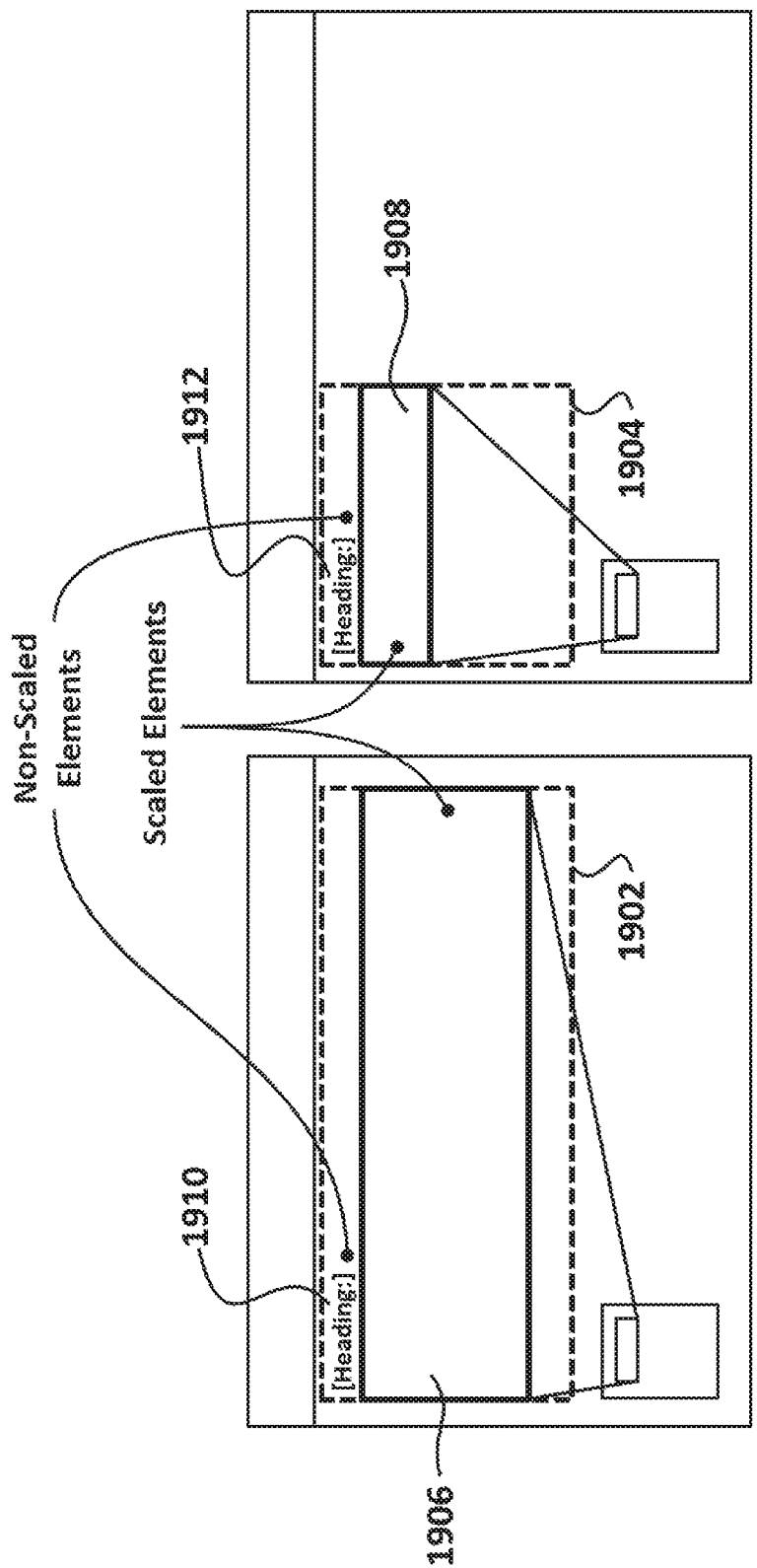
FIG. 19 illustrates a scaler feature in accordance with one or more embodiments of the present invention.

The slide creation application will also store and apply non-scaled slide elements in conjunction with a scaled slide element (see for example discussion of scaler areas). These are sometimes referred to as being static. Some elements or visual components of a scaled, positioned, and proportioned annotation set group should preferably not change size from slide to slide. For example, the font size of a heading or cite should stay the same. A cite can be text that, for example, communicates a citation for a related piece of evidence or law. The slide creation application uses at least two measurement systems for the elements that are to fit in combination into a scaler area. One set of slide elements will be scaled from a starting size while the other elements will exist at a constant size. Slide elements that preferably remain constant/non-scaled include a heading, heading offset, top edge pad, top offset, cite offset, cite, bottom offset, bottom edge pad, and space next to torn page. For example, in FIG. 19, scaler areas 1902 and 1904 in the two illustrative presentation slides are generated for image excerpts (or tearouts) 1906 and 1908. Excerpts 1906 and 1908 are scaled to fit in the scaler area. The excerpts are combined with heading elements or components 1910 and 1912 that are non-scaled elements that have a fixed size that is not affected by the scaling or resizing of image excerpts 1906 and 1908. As shown the application, incorporates an evaluation of the geometric shape, size, or orientation of a combination of elements (heading and image excerpt) and the size, shape, or orientation of the scaler area in determining the scaling to be applied to the image excerpt. In other words, the scaling that is determined is identified by analyzing the graphic properties of the combination of elements.

To further clarify or elaborate, the scaler area can be an intelligent tool implemented using programmable spatial slide rules such as the rules discussed herein. Known conventional system include the ability for a user to manually adjust the size of a slide element or a group of slide elements, but there has been no advancement in the sense of providing the ability to add user content and automatically scaling the content to fit the dimensions of the slide element. To be explicit, there may be geometric differences such as between a slide element that is the shape of a rectangle and user content that is the shape of a square. The software application using the scaler area tool automatically detects the different dimensions and determines the change in scaling based on evaluating the dimensions that result in the best fit. The application may also have preference settings that may be user-selected that specify settings that affect the spatial relationships and scaling. For example, a setting may be that it must only perform proportional scaling or that the upper edge of the user content is pinned (e.g., to a point of the scaler area, such as top left) or aligned (e.g., centered in the scaler area) to provide a reference point for determining the level of scaling and positioning. The settings can be part of the programmable spatial slide rules. The process includes identifying and providing coordinates for the position of the user content on the slide after the content is scaled. This way the application specifies scaling and positioning as part of this feature in generating slides.

The scaler area, as an application tool, is programmed to provide a feature that automatically scales content differently based on or as a function of the content. Some content is preferably maintained at a constant scale such as headings. Content can be differentiated by the tool based on an identifier or label previously assigned to the particular content that specifies its type, e.g., heading, icon, etc. The scaler area is configured to allow a group of user content to be added and scaled to fit a spatial area of a scaler area. As mentioned above, the scaler area includes associated functionality for manually or automatically selecting an area in a slide to be designated as a scaler area. The scaler area would differentiate the level of scaling applied based on the particular content (or possibly element type) so as to for example, maintain some content such as static content, e.g., headings at the same size while scaling other content or elements. The scaler area performs the calculations to determine the spatial profile of a combination of contents or elements that are part of a group and determine which are static and which can be scaled and also based on the calculations determines the scaling that best fits the scaler area. As a result, the scaling of some content is performed and some content is maintained static resulting a spatial profile that fits the scaler area. The application as part of the feature also applies related settings such as alignment or pinning to determine the coordinates and the best fit in view of the alignment and/or pinning and spatial dimensions.

This feature is an advancement over known prior art systems for a number of reasons. Known prior art systems provide very primitive scaling capabilities. For example, the scaling of a group of elements is performed to all of the spatial elements in the group. For example, in some known systems, the font size may not be affected but its spatial element/container and all other elements are scaled at the same rate which results in an awkward arrangement. To a user, this conventional approach is intuitive because the user would expect the scaling to apply to all of the element. In embodiments of the present invention, the scaling is counter-intuitive in that all of the elements are not configured to be scaled at the same proportion even though scaling is performed. This improves over known systems because the result is intelligently tuned to the content and avoids awkward slide arrangements. It also provides efficiency in that the user would not necessarily need to revise slides because of the intelligent rules applied by the scaler. Another advancement is that in embodiments of the present invention, the scaler area provides a new tool that automatically performs the scaling to fit or implement a best fit for a particular area. It takes into account the content, as a group, and fits it into a spatial area (a spatial area that is subdivision of the slide or portion of the slide). Known prior art system lack such functionality.

To further elaborate, a presentation slide creation system that automatically generates presentation slides can include a graphics engine that applies the programmable spatial slide rules to user content to generate a resultant slide. The system includes software that implements a scaler area, which can be embodied in a portion of a set of programmable spatial slide rules. The system can identify one or more scaler areas, wherein a scaler area is configured to have spatial dimensions. The system is configured to determine and scale spatial dimensions of a group of user content (for example), including user-selected document content, that has been added to the scaler area and to determine resulting dimensions that fit the spatial dimensions of the scaler area. User content may be automatically added or combined (e.g., with an image) to create the group. The process can involve applying a set of corresponding programmable spatial slide rules to user content. The process produces a slide element (or group of elements) having a particular spatial dimension and position in the slide in accordance with the programmable spatial slide rules and other factors (or combination of factors such as the dimensions of the page of the slide). As part of generating the resultant presentation slide, scaling is performed that uses properties of the scaler area and properties (dimensional) of the group of user content in the scaler area to determine the resulting dimensions in the scaler area. As part of the scaling, the system differentiates in applying different levels of scaling to different user content in the scaler area.

The presentation slide creation system, as discussed, can implement a scaler area that scales the group of user content by scaling a first portion of the user content while maintaining scaling of a second portion of the user content at a constant scale and determines a best fit for the group in the scaler area based on a resulting spatial dimensions of the group based on scaled and static user content. In implementing a scaler area for a group of content, the system (as generally understood using an application that configures operations) determines dimensional properties of the group as a whole (e.g., for a particular arrangement of the items in the group) to determine the dimensions of the overall profile. The system performs calculations using the graphics engine and the rules to determine scaling that is applied to the group to obtain a best fit of the profile into the scaler area (taking into account settings such as alignment). This can involve determining the dimensions of the scaled group. The scaling in accordance with the rules involves differentiating between content so as to apply different scaling based on content (e.g. maintaining some types as static). The system will determine the extent of scaling and resulting profile after scaling. The software may use boundary limits when determining the extent of scaling and resulting scaled group. In other words, the system can scale up to a limit where it determines that a side of a profile of a group has reached one of the boundaries of the scaler area. This would also take account position settings such as whether the group is to be pinned to the top edge or middle edge of the scaler area. The resulting information that is produces includes the scaled content and slide elements containing the scaled content. It will also include the coordinates for the resulting slide elements such as coordinates for one corner of the slide in the context of the page of the slide.

As a matter of clarification, the system can optimize or produce a best fit for slide elements in a scaler area and in addition, the system can generate and determine the spatial dimensions and positions of other elements in the same slide using the programmable spatial slide rules (e.g., by having the graphics engine apply the rules). The system can apply the rules to determine the spatial dimensions and position of other elements, e.g., after completing the process for the scaler area. The system can use the spatial dimension and position of the slide element(s) in the scaler area in performing the determination for other elements in the slide. The result of the process can include positioning slide elements in or partially into the original dimensions of the scaler area which were left unused after the scaling is performed for the scaler area.

Scaler areas can provide a powerful tool for users to be able to easily produce a high quality slide by specifying scaler area and associated desired content. The process in response can provide slide elements at a best fit and appropriate dimensions using the programmable spatial slide rules.

It should be understood that in discussion, user content such as an image or image excerpt is, in operation, being inserted into a slide element that is created for holding that user content in that slide. This general convention is used herein. The slide element can be scaled and the user content is also scaled to fit in the spatial configuration of the scaled slide element.

Figure 20:
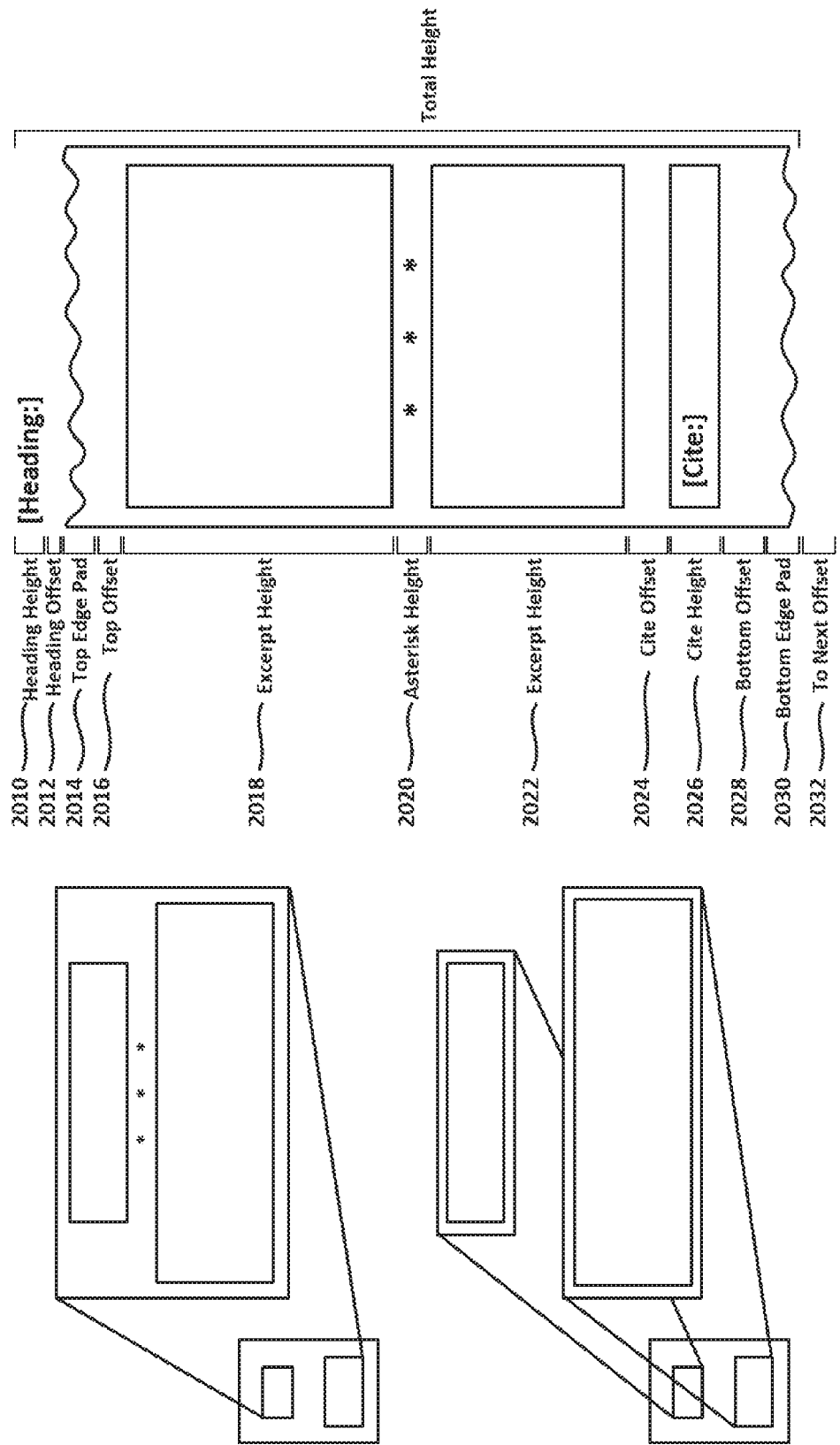
FIG. 20 illustrates a slide creation process in accordance with one or more embodiments of the present invention.

FIG. 20 is illustrative of the complex processes that the slide creation application performs. As in all cases, these figures are for illustrative purposes and the textual labels are included for clarification. The combination of elements for a presentation slide includes a combination of scaling and non-scaling elements, different physical shapes for the source images, static (e.g., the three asterisks) and dynamic artwork slide elements, scaler areas, template orientation, page size, and other factors. In this example, the slide creation application processes this information and addresses offsets or spatial buffers in the process of determining the scaling of the image excerpts and positioning of the elements as part of the scaling or positioning process. Spatial buffers can be encoded in the programmed spatial slide presentation rules to be automatically applied when the application is determining slide layout or properties in creating or modifying a slide. "Spatial buffers" refers to predetermined or user-configurable minimum spacing between elements that can include offset or other similar parameters. As shown, the slide creation determines and applies heading height 2010, heading offset 2012, top edge pad 2014, top offset 2016, excerpt height 2018, asterisk height 2020, second excerpt height 2022, cite offset 2024, cite height 2026, bottom offset 2028, bottom edge pad 2030, and to next offset 2032. These setting can be understood to those of ordinary skill in the art based on the figure and the descriptive language (as in all cases). For example, top edge pad refers to an area that corresponds to an area that would contain a graphic feature (paper cutout graphic at the edges of a graphic object). In this example, the top edge pad is a measurement of the width of the graphic that is used to illustrate the wavy paper cutout illustrated in the figures. That graphic, the entire graphic can be an image that is inserted into the slide and the width is needed by the software in order to avoid conflicts with other elements that can lie over, under, or adjacent to the graphic. The slide creation application can define offsets as a measure for avoiding conflict in elements and avoiding elements from being immediately adjacent to each other. These features can be implemented using a set of programmable spatial slide rule and can be applied using the graphics engine. Such features can be applied as part of a scaler area.

Saved settings can be used in a GUI of the slide creation application to open a slide to remake for editing, or to apply as a flexible template towards making a new slide having different content. Several types of settings are implemented, including slide, annotation set group, and annotation. The interface control settings for the slide can include options for clip art, slide design, etc. Settings for each page group can include color options for the tearout elements, scaler properties, and logic settings for element behavior. Optional settings for each annotation include specified color (or color combinations) and logic for element behavior.

Figure 21:
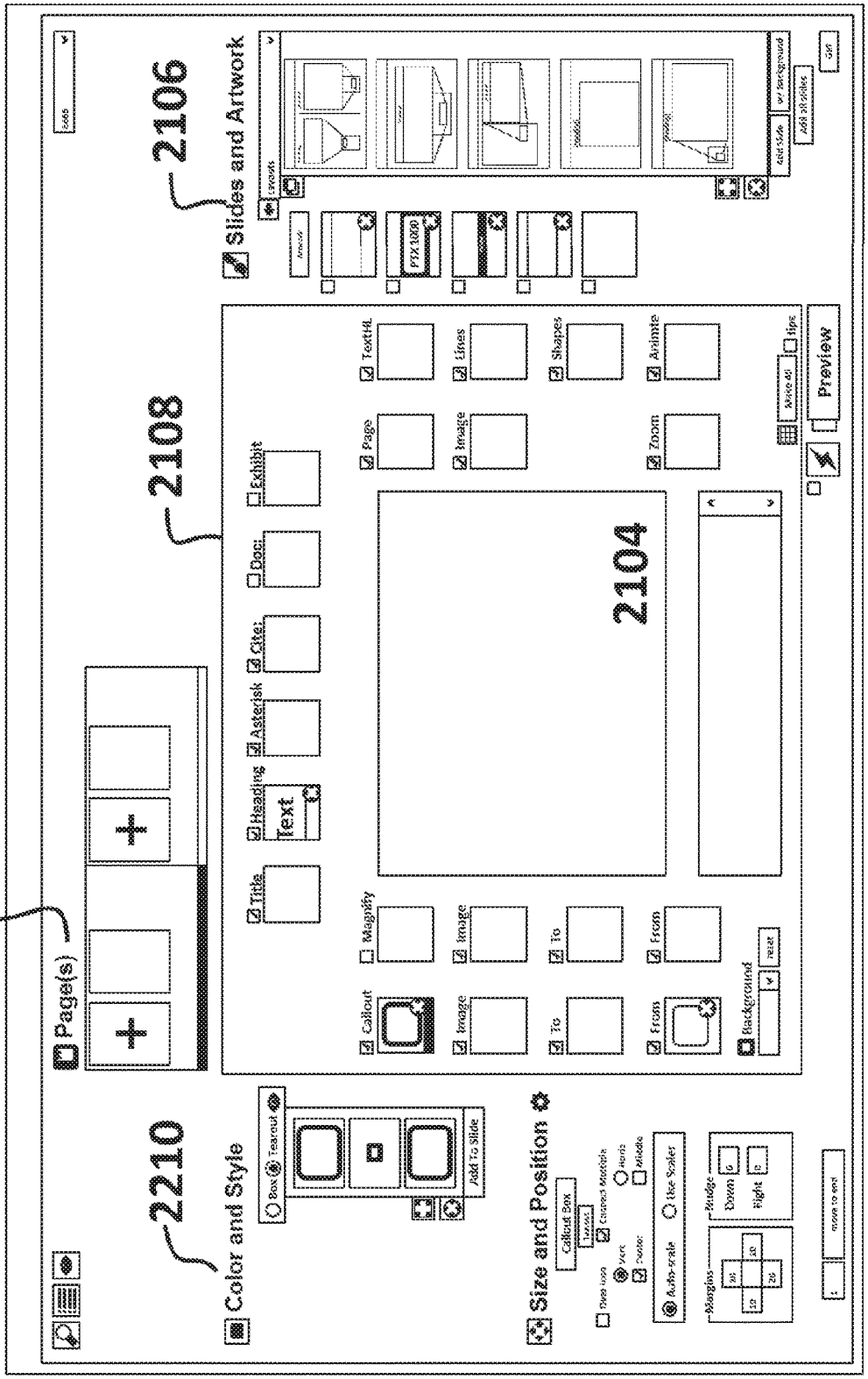
FIG. 21 is a diagrammatic representation of a graphical user interface in accordance with one or more embodiments of the present invention.

For example, FIG. 21 illustrates a GUI for the slide creation application for use in designing and creating slides using various options. The slide creation application can display interactive window 2100 to a user (e.g., as part of a resident or web application). Window 2100 can include multiple areas. For example, annotation set group options 2102, as discussed above, are used interactively to define annotation set groups. Area 2104 is used to display a preview of the current slide, which is sometimes referred to as a preview screen or preview interface. Area 2104 can be considered an art board. Slides and artwork area 2106 includes interactive options for selecting artwork for the current slide and selecting a template to be applied to the current slide. Slide element component area 2108 includes user-interactive options that provide the user with the ability to select elements that are available in the current template by using window 2100. Selection of these elements and a displayed option category can automatically change options area 2110 that presents additional interactive options that are used to further define the selected element in area 2108. The user can press "preview" to have the current annotation sets, resulting slide and its current setting previewed in the area 2104. The make option generates the resulting slide in the file format of the destination application. The resulting slide (from the make operation) can be played or opened in the third-party slide creation application. A user is also provided with the option to "make all" which when selected makes (generates) a resultant slide by using the select settings and source images/annotations. There is a difference between "preview" and "make" or "make all" in that "preview" presents an updated visual display simulating a resulting slide in area 2104. It simulates the resulting slide when it is generated.

Another aspect of embodiments of systems or applications in accordance with the present invention is that embodiments implement a process that divides a source document into multiple data streams (such as by using distinct files), separately processes the streams, and converges the results, creating a slide. When a source document containing user content is made available to the system, the source document may be converted by the application into several formats. The formats will each be more suitable for a particular use than the source format. For example, the application saves a page of the document as an image file that allows for more convenient image processing. This capability may be desired during the export of the output to specific formats such as pptx. Additionally, saving the document as XOD, tif, or PDF allows the convenience of using applications and tools that can display and annotate these common formats.

If available, data describing annotations will be extracted or converted to an annotation storage format that in this example will be xfdf. In this example, the slide creation system will read and write to these xfdf files. Different programs store annotations in different formats that can be converted to xfdf. For example, Acrobat and WebViewer both store annotations as xfdf; however, all the values are not written in exactly the same manner, so a conversion is required. Similarly, many programs that are used by users such as lawyers allow the making and saving of annotations but require conversion. Some of these programs are Good Reader, Concordance Sanction, Trial Director, Westlaw, and Crocodoc Box.

Figure 22:
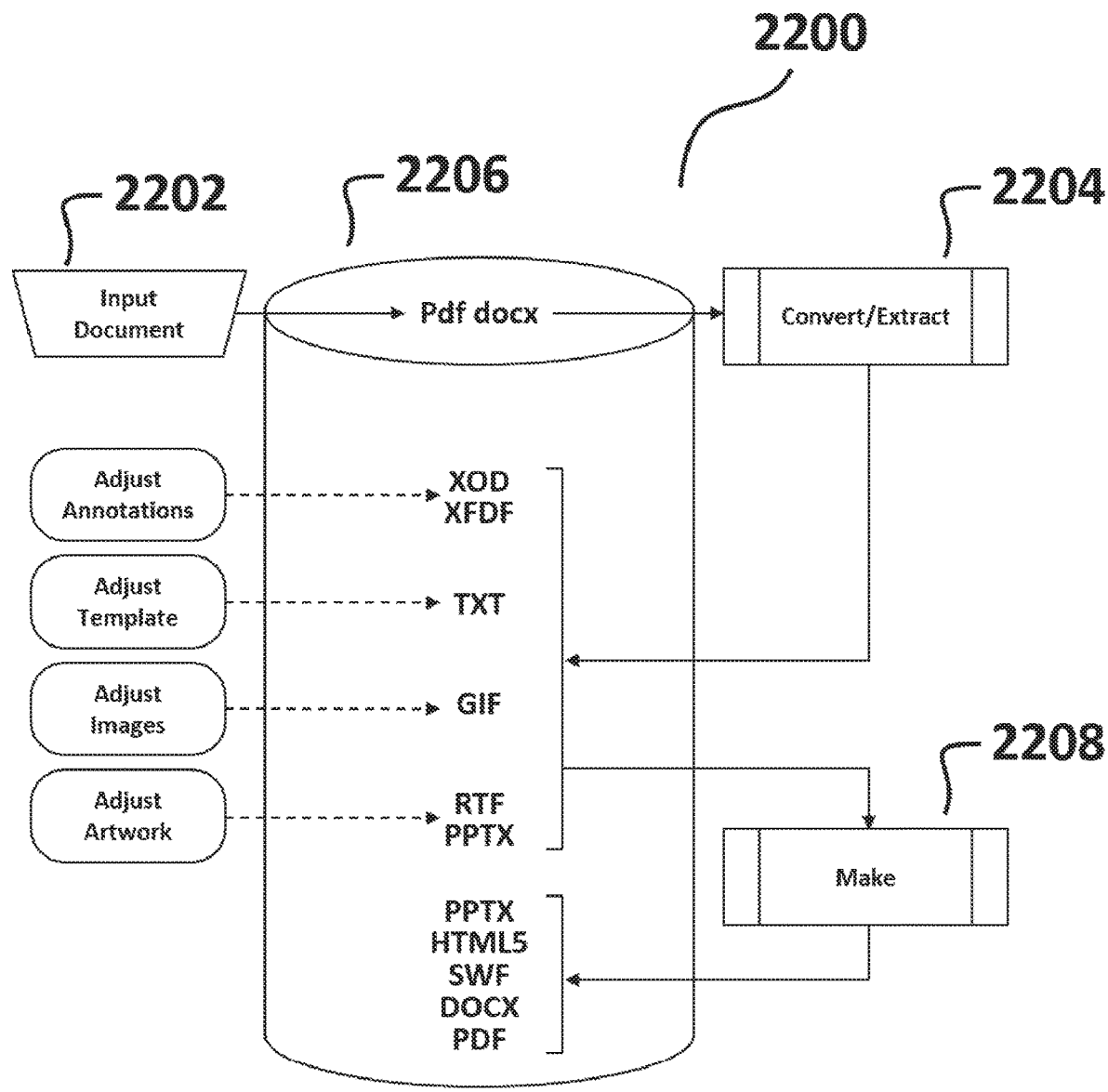
FIG. 22 is a diagrammatic representation of a system in accordance with one or more embodiments of the present invention.

For example, FIG. 22 is an illustrative view of the slide creation system that by way of illustrating system components and processes demonstrates certain aspects of embodiments of the present invention. The system performs an end-to-end process in which a source document in one format is processed and used to generate separate files in other formats. The resulting tiles are used in adjusting and creating a slide. After adjustment, the system merges the different files and applies its processes to generate a resultant presentation slide. For example, system 2200 can receive or retrieve input document 2202. The system allows the user to initially upload a document (e.g., PDF, .docx), a scanned image of a page (tit), or a textual cite (txt). Convert/extract module 2204 (a module can be a series of submodules or processes) applies the required format conversions (e.g., xod, gif, png) and data extractions (e.g., xfdf or rtf).

For example, convert/extract module 2204 identifies an active or tagged page within the pages of a PDF document and converts that page (without annotations) to an image (in image format such as gif). Convert/extract module 2204 extracts data from input document 2202 such as by extracting user-added annotations (added to the input document in a PDF application such as Acrobat). Convert/extract module 2204 processes the extracted data and converts into another format and into separate files (separate data streams). Convert/extract module 2204 can convert extracted data into destination data formats that may involve performing conversion of layout locations to match a destination application (e.g., PowerPoint). Convert/extract module 2204 can correspond to or include features of the translation process and slide elements module, described above. As evident from this process, system 2200 applies processing to input document 2202, a single file representing a document, that separates data into separate data groups or file formats and extracts only the relevant page from the document. As a result, the convert/extract module generates a first set of data that is formatted in a first format, xod or xfdf, that defines user-added annotations, second set of data in a second format, txt, that applies a template, a third set of data in third format (image), gif, that defines the base image (in full) that is used for generating the slide. The software holds the annotations in groups; usually, a marked-up page is considered one annotation set.

The files or data are stored in a memory workspace, memory 2206, that can be non-transient memory that is locally stored or stored on the web, There could also be a shadowing procedure applied. System 2200 can process the generated outputs of the convert/extract module 2204 and combine the data. The processing generates a resultant presentation slide in an additional file format that is structured for viewing, playing, and adjusting a presentation slide. In some instances, RTF or PowerPoint may be used for the format. The user may have the ability to make changes and additions to the annotation sets, the template design, the images, artwork (e.g., graphics), and other slide elements that will be combined as assets to create the slide. System 2200 can include a GUI that provides the user with the ability to adjust the data (adjust annotations, adjust template, adjust images). System 2200 can include a preview work area that displays a preview of the slide (e.g., using pptx) and provides the user with the ability to interact with the slide to adjust it. System 2200 can include a selectable auto or manual mode that permits to system to apply dynamic changes to the slide as a user makes adjustments or to only apply its intelligent processing when a user selects "make."

System 2200 can include make module 2208 that generates (converges/integrates) the source data generated by system 2200 into a final presentation slide such as one that is in pptx format. Other formats can be pptx, HTML5, swf, docx, and PDF. System 2200 can have the intelligence to insert relevant data into appropriate positions, locations, subfiles, or structure in the destination format (e.g., pptx). For example, the destination format can be XML-based and system 2200 manages and inserts data into appropriation locations in an XML and as a result, creates a pptx file that is compatible and operates within the destination application as if it was generated by the destination application.

Figure 23:
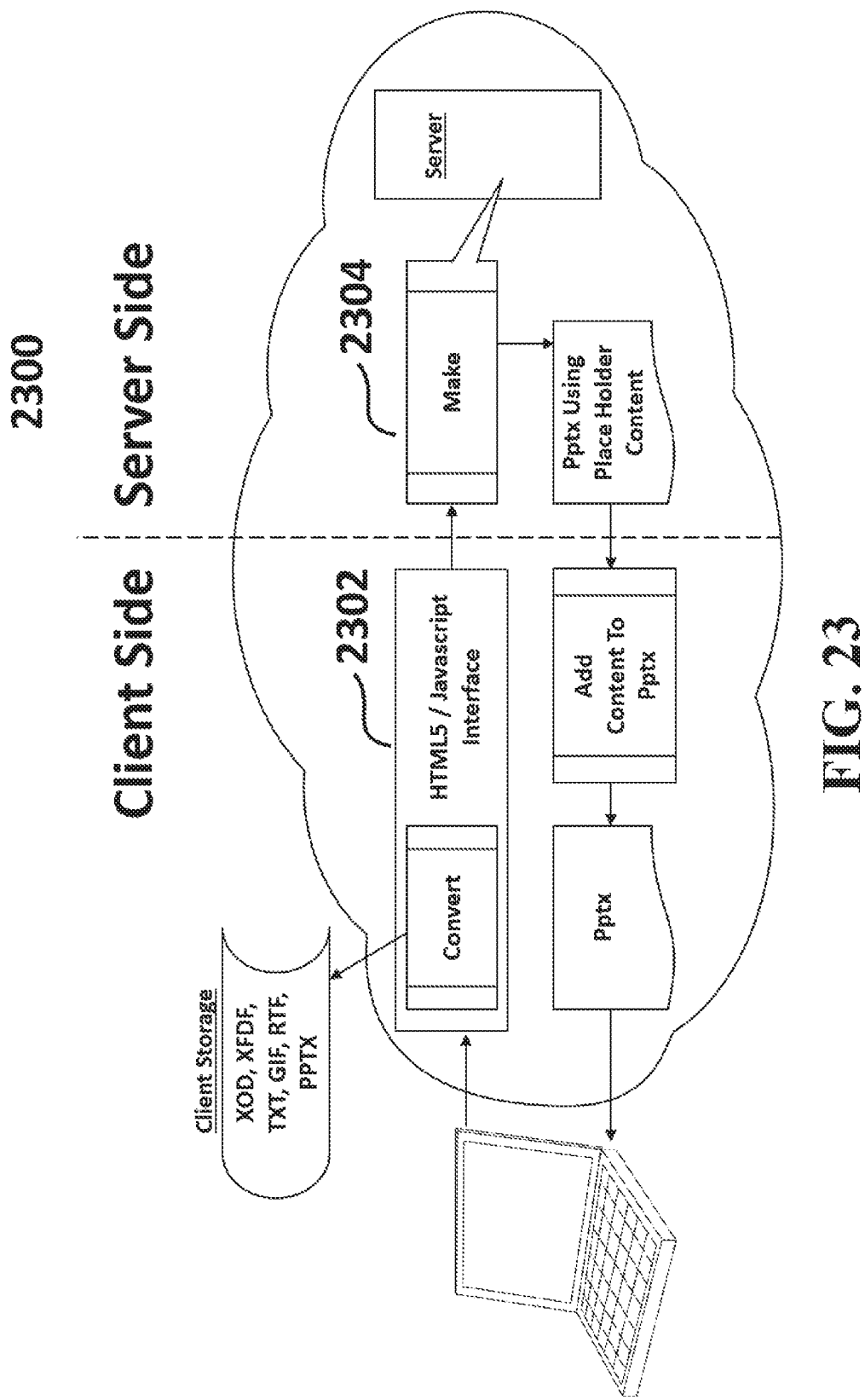
FIG. 23 is a diagrammatic representation of client side and server side operations in accordance with one or more embodiments of the present invention.

FIG. 23 further illustrates embodiments that divide the slide creation application and its operation between a client and a server. This may be useful in applications in which users do not want their content (images or image excerpts) from being transmitted externally (transmitted out of their private network or out of their computer) because it may contain highly confidential information such as attorney work product or technical information that is subject to a protective order). This embodiment also prevents the client device from having access to the mechanisms and process by which the graphics engine accomplishes its tasks. In this structure, the system performs graphics processing at the server by receiving layout or framework data (e.g., information such as the shape of an excerpt and its scaler area) without the underlying image or confidential information. System 2300 includes as part of the slide creation application (as either a resident or a web application) html/javascript interface 2302 that uses javascript coding and html to transmit data from convert/extract module to the server. In this configuration, a converted image or user-added content (such as a heading) will be retained and not transmitted to the server. The client side of the application manages the separation of the data between data that is locally protected and graphical layout data that is transmitted to the server. The client side of the application implements an association process that saves keys or links that connects individual graphical layout elements (slide elements) with user content that is retained and protected on the client side (e.g., at the client computer).

Make module 2304 is implemented on the server and in response to receiving packets from html/javascript interface 2302 processes and implements the make operation. Make module 2304 generates a resultant presentation slide from the data (data received from the convert module). For example, it generates a pptx file in accordance with illustrative processes described herein using placeholder content. Placeholder content is added to the slide if needed by the format or application. Otherwise, a marker or key is added. The server transmits the resultant presentation slide, e.g., the pptx file, over the network (e.g., the Internet) in a cooperative manner to the client side application. As it should be understood, system 2300 implements a communication channel between the server and client device that carries the graphics-related communications and also provides security and other features such authentication, billing, storage, application-related tools, additional templates, or additional artwork.

On the client side, the computer and application merges the user content (e.g., image excerpt) into the received presentation slide (pptx file) from the server. This can be performed using a link or key that is stored locally and transmitted to the server, which is then returned to appropriately link the content to the appropriate place in the slide. One way to implement this is to store the image file name and cropping information in PowerPoint shape element tags and encrypt the image file name tag before it is sent to the server. The server can then create the required PowerPoint shape elements and add the tags to the them. When the server transmits the slide to the local client, the client can decrypt the image file name (e.g., gif file name), generate the image excerpts, and link them to the appropriate slide elements. Other ways to achieve the same results include storing the image file name on the local machine in a variable, table, or database and sending a key to the server that when received back identifies the location of the image file name. The key or link can, for example, be individual alphanumeric codes that are assigned on the client side to corresponding annotation sets or slide elements and transmitted together to the server side. The client side can maintain a table of the codes for matching when the server side transmits to the client side the results of the processing performed on server side for generating a slide (which will include the codes).

Figure 24:
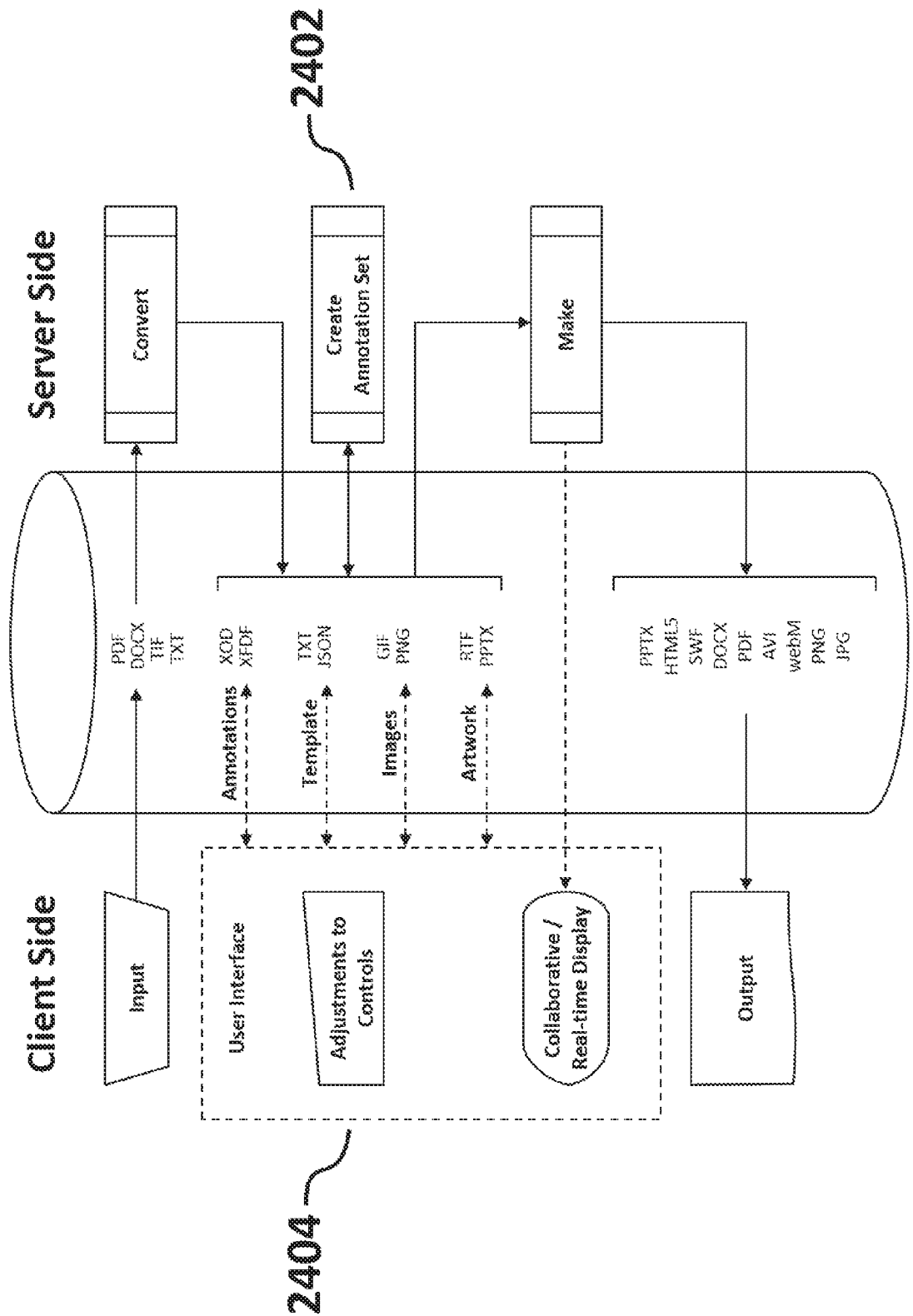
FIG. 24 a diagrammatic representation of a client side and server side operations related to FIG. 22 in accordance with one or more embodiments of the present invention.

FIG. 24 is an illustrative embodiment that is based on an illustrative embodiment of FIG. 22. FIG. 24 illustrates, among other things, a client-server arrangement, aspects of which have been discussed above. One or more of the modules on the server side may be implemented in special-purpose circuitry (e.g., ASIC or FPGA) for performance reasons. If desired, this configuration can be implemented entirely or substantially on the client side or the server side only. In this embodiment, create annotation module 2402 is illustrated that explicitly identifies a feature with which a user interacts through user annotations (e.g., annotations created in a resident application of a source document) or through user interface 2404 to select and define annotations for a slide. User interface 2404 is similar to the user interface controls illustratively shown in FIG. 22 that are available for user interaction through an interface of the slide creation application. One way to provide feedback to the user when making these choices is using confidence monitoring. Alternatively, the user interface can generate an approximation. The approximation can be the "preview" display that is approximating the resultant slide as opposed to constantly rendering the slide using the make module. Note that this system, by identifying AVI as a format, explicitly contemplates the incorporation of audio/video into slides. The system can include additional inputs for integrating content into slides. As shown, the system generates slides for the user and returns them to the client device.

The make module can implement several processes, which can be implemented in accordance with embodiments of the present invention. The make module or function can include loading annotation set groups, loading settings, adding tearouts (e.g., image excerpts from an image), and adding clip art.

The slide creation application can obtain annotation information by various techniques. For example, annotation information can be created for the slide creation application using a built-in document viewer, using information transmitted from an external application, using logic which constructs annotation information from a cite, using logic that separates annotation information from a flattened image, or other techniques. Other examples include the slide creation application converting annotation information extracted from a file and retrieving annotation information previously stored by the system.

With respect to the use of a flattened image, the slide creation application can include a module (e.g., as a separate part of a mobile device, which can be a distinct separate software application directed to this purpose or a combination of software and hardware on the device for this purpose) that is directed to capturing and converting annotations marked in a physical document using an image capture device such as a camera of a mobile device. The module is preferably configured to receive a captured image of a page of a document and apply image processing that identifies annotations that were previously marked on the page. For example, the module can review the image and distinguish between text already contained in the page (before the annotation) and annotations added to the page by the user. This can be performed, for example, by recognizing information on the page as matching a certain font and recognizing lines or handwritten notes that were added by evaluating the location (e.g., in margins or open areas) of the page or the shape of the information on the page (e.g., a line or rectangle). The module uses the captured annotation information and identifies an annotation on the page and converts that annotation to an annotation set. The same can be performed for multiple annotations if, for example, there is more than one annotation on a page of the document. The camera on a mobile device (e.g., mobile telephone) is preferably used in conjunction with an app to capture an image of a sheet of a physical document and in response, the app (on the mobile device or as part of a distributed system such as client server arrangement) processes the image, detects annotations on the image (e.g., made my hand), and converts the annotations to an annotation set(s). It would be understood that processes and systems as described herein are implemented on the mobile device or can be applied or combined with the embodiment that uses a camera on a mobile device.

The slide creation application can obtain template information by, for example, retrieving stored template information selected by a user or using values stored as default template information.

The template information of the slide creation application may, for example, indicate whether slide elements should be included in a slide and the colors, styles, and behaviors of slide elements that should be used.

In some embodiments, the system is configured to encourage users to operate within the slide creation application in preference over the conventional software application. As discussed above, the slide creation application can embed two types of coding or commands into a presentation slide (e.g., its file or files that form the slide). A first type is codes that are used and compatible with the conventional or third-party software application. These codes are generated in order to generate an output slide that is fungible and easily shared, accessed, or viewed because of the prevalence and familiarity of the public with that software application (e.g., PowerPoint). A second type of code or commands is those that are added, compatible with, and used by the slide creation application. Both types are stored in a presentation slide that is displayed by the conventional software application and the inclusion of the second type (such by use of XML) is implemented in a configuration that does not interfere or cause problems in the conventional application. The second type or set of code is readable and compatible by the slide creation application and it, for example, makes available advanced editing or slide manipulation tools that are not accessible or available in the conventional or third-party software application. The code can be encrypted and in doing so, the code cannot be reviewed or copied by a third party without the necessary encryption information to decode the code. In addition, the code can include authorization or authentication information such as information that links the slide to an account for billing purposes.

To the extent methods, processes, or steps are described, it is understood that these are implemented or used to configure software, computers, tablets, smartphones or other embedded computer devices for embodiments of the present invention. The general structure of computers is well known. Slide creation and presentation development application are an established field of technology. A separate and additional field of technology is specialized litigation support software and systems. Similar software can exist in other fields. The present computer-implemented inventions improve these existing areas by implementing detailed applications that advance the field of technology.

To clarify, the present description sometimes describes the operation of the system, method, or computer-readable medium by providing a description of the operation or structure from the user's perspective. It should be understood to describe the system or application.

It is understood from the above description that the functionality and features of the application, systems, or methods of embodiments of the present invention include generating displays or sending signals to accomplish the actions.

It should be understood that variations, clarifications, or modifications are contemplated. Applications of the technology to other fields are also contemplated.

Exemplary methods and systems are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of system connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action; process, or feature is in response to an earlier action, process, or feature.

It is also implicit and understood that the applications or systems illustratively described herein provide computer-implemented functionality that automatically performs a process or process steps unless the description explicitly describes user intervention or manual operation. In some instances, the word "automatically" is used in a context in which it would already be understood that the described function or operation is automatically performed even without the use of that word but the word has been included in some instances in the description to emphasize, clarify, or make explicit that it is an automated implementation.

It should be understood that claims that include fewer limitations; broader claims, such as claims without requiring a certain feature or process step in the appended claim or in the specification; clarifications to the claim elements; different combinations; and alternative implementations based on the specification, or different uses, are also contemplated by the embodiments of the present invention.

To the extent not described explicitly, the processes, involving the creation of slide elements and producing new slides, can involve determining, modifying, scaling, creating, or specifying spatial dimensions for slide elements and includes determining and specifying a location or position of the slide element (or group of slide elements) in the resulting slide. The location or position can be determined by the graphics process, the programmable spatial slide rule; and/or other components or criteria. When a slide element is produced, the resulting data will include, for example, coordinates (x and y location) on the page of the slide (in the form of the coordinate system of the slide presentation application). A single coordinate if pinned to a location on the slide element (e.g., upper left) might be sufficient for present purposes.

If not explicitly discussed, it should be understood based on context and type of feature that a set of programmable spatial slide rules can implement a described feature related to creating a slide element or arranging elements on a slide.

If desired the programmable spatial slide rules can be incorporated into the graphics process or engine. A smart template if desired as an alternative can potentially be implemented as a set of programmable spatial slide rules.

It should also be understood that the described embodiments are directed to inventions that are systems, software applications, methods, processes, computer readable medium (articles of manufacture) that store computer executable instruction in non-transient memory, or other types or categories (the given list is over inclusive). And that even if the description may be specific to one such type, it would be understood that the other types are contemplated. For example, a description of a computer implemented system would be understood to contemplate a method or a computer readable medium that store computer executable instructions for implementing the system or portions of the system.

It should also be understood that when a list or group of items are provided, subcombinations of the items on the list or group are also contemplated as an option.

In general, a module refers to a software process that is implemented on a computer.

It should be understood that combinations of described features or steps are contemplated even if they are not described directly together or not in the same context.

What is claimed is:

1. An interactive document management system that manages and organizes documents comprising a document management application that is implemented on a computer using computer readable software instructions stored in non-transient memory, wherein the document management application is configured to:
- include hierarchical category tags in the application that are user assigned to an entity to characterize its content;
- display an interactive option in which a user selectively assigns one of the hierarchical category tags to an entity; and
- store user-selected and assigned hierarchical category tags in association with corresponding entities for retrieval in the application,
- wherein the computer is configured to store a plurality of entities, allow a user to select one of the hierarchical category tags and in response display a representation of all of the stored entities that are assigned the selected hierarchical category tag, wherein the representation is thumbnail of the entity; and
- wherein the computer is configured to define hierarchical category tags in correspondence with a section of a document and retrieve an image of that section when the corresponding tag is selected.

2. The interactive document management system of claim 1 wherein the computer is configured to display a visual representation of the hierarchical category tags.

3. The interactive document management system of claim 1 wherein the computer is configured to display nodes illustrating a plurality of tag hierarchy.

4. The interactive document management system of claim 1 wherein the computer is configured to display information with each hierarchical category tag that communicates how many entities are assigned that hierarchical category tag.

5. The interactive document management system of claim 1 wherein the computer is configured to display information with each hierarchical category tag that communicates how many entities are assigned to that hierarchical category tag and how many entities are assigned to entities below that hierarchical category tag.

6. The interactive document management system of claim 1 wherein the computer is configured to display a plurality of entities in a thumbnail view.

7. The interactive document management system of claim 1 wherein the computer is configured to define hierarchical category tags in correspondence with individual annotation sets.

8. The interactive document management system of claim 1 wherein the computer is configured to when the corresponding tag is selected, retrieve an image of that section and allow a user to review a document in which the section is contained.

9. The interactive document management system of claim 1 wherein the computer is configured to store a plurality of entities and in response to a selection of one of the hierarchical category tag, display stored entities that are assigned the select hierarchical category tag and also entities assigned hierarchical category tags below the selected hierarchical category tag.

10. The interactive document management system of claim 1 wherein the computer is configured to define hierarchical category tags in correspondence with a section of a page of a document, retrieve an image of that section when the corresponding tag is selected or to allow a user to review a document in which the section is contained.

11. A computer readable medium containing computer readable software instructions stored in non-transient memory for managing and organizing documents comprising a document management application, wherein execution of the software instructions by a computer system causes the one or more computer to carry out the steps comprising:
- including hierarchical category tags in the application that are user assigned to an entity to characterize its content;
- displaying an interactive option in which a user selectively assigns one of the hierarchical category tags to an entity; and
- storing user-selected and assigned hierarchical category tags in association with corresponding entities for retrieval in the application
- wherein the steps comprising storing a plurality of entities, allow a user to select one of the hierarchical category tags and in response display a representation of all of the stored entities that are assigned the selected hierarchical category tag, wherein the representation is thumbnail of the entity; and
- wherein the steps comprising defining hierarchical category tags in correspondence with a section of a document and retrieving an image of that section when the corresponding tag is selected.

12. The computer readable medium of claim 11 wherein the steps further comprises displaying a visual representation of the hierarchical category tags.

13. The computer readable medium of claim 11 wherein the steps further comprises displaying nodes illustrating a plurality of tag hierarchy.

14. The computer readable medium of claim 11 wherein the steps further comprises displaying information with each hierarchical category tag that communicates how many entities are assigned that hierarchical category tag.

15. The computer readable medium of claim 11 wherein the steps further comprises displaying information with each hierarchical category tag that communicates how many entities are assigned to that hierarchical category tag and how many entities are assigned to entities below that hierarchical category tag.

16. The computer readable medium of claim 11 wherein the steps further comprises displaying a plurality of entities in a thumbnail view.

17. The computer readable medium of claim 11 wherein the steps further comprises defining hierarchical category tags in correspondence with individual annotation sets.

18. The computer readable medium of claim 11 wherein the steps further comprises, when the corresponding tag is selected, retrieving an image of that section and allow a user to review a document in which the section is contained.

19. The computer readable medium of claim 11 wherein the steps further comprises storing a plurality of entities and in response to a selection of one of the hierarchical category tag, displaying stored entities that are assigned the select hierarchical category tag and also entities assigned hierarchical category tags below the selected hierarchical category tag.

20. The computer readable medium of claim 11 wherein the steps further comprises defining hierarchical category tags in correspondence with a section of a page of document, retrieving an image of that section when the corresponding tag is selected or to allow a user to review a document in which the section is contained.

21. A computer implemented method for managing and organizing documents in a document management application, wherein the involving steps comprising:
- including hierarchical category tags in the application that are user assigned to an entity to characterize its content;
- displaying an interactive option in which a user selectively assigns one of the hierarchical category tags to an entity;

storing user-selected and assigned hierarchical category tags in association with corresponding entities for retrieval in the application storing a plurality of entities, allow a user to select one of the hierarchical category tags and in response display a representation of all of the stored entities that are assigned the selected hierarchical category tag, wherein the representation is thumbnail of the entity;

and wherein the steps comprising defining hierarchical category tags in correspondence with a section of document and retrieve an image of that section when the corresponding tag is selected.

22. The computer implemented method of claim 21 wherein the steps further comprises displaying a visual representation of the hierarchical category tags.

23. The computer implemented method of claim 21 wherein the steps further comprises displaying nodes illustrating a plurality of tag hierarchy.

24. The computer implemented method of claim 21 wherein the steps further comprises displaying information with each hierarchical category tag that communicates how many entities are assigned that hierarchical category tag.

25. The computer implemented method of claim 21 wherein the steps further comprises displaying information with each hierarchical category tag that communicates how many entities are assigned to that hierarchical category tag and how many entities are assigned to entities below that hierarchical category tag.

26. The computer implemented method of claim 21 wherein the steps further comprises defining hierarchical category tags in correspondence with individual annotation sets.

27. The computer implemented method of claim 21 wherein the steps further comprises when the corresponding tag is selected, retrieving an image of that section and allow a user to review a document in which the section is contained.

28. The computer implemented method of claim 21 wherein the steps further comprises in response to a selection of one of the hierarchical category tags, displaying stored entities that are assigned the select hierarchical category tag and also entities assigned hierarchical category tags below the selected hierarchical category tag.

29. The computer implemented method of claim 21 wherein the steps further comprise defining hierarchical category tags in correspondence with a section of a page of document, retrieving an image of that section when the corresponding tag is selected or to allow a user to review a document in which the section is contained.

\* \* \* \* \*